(12) United States Patent
Cuerda et al.

(10) Patent No.: US 12,214,702 B2
(45) Date of Patent: Feb. 4, 2025

(54) CLIP FOR UPHOLSTERY COVER

(71) Applicant: YKK Corporation, Tokyo (JP)

(72) Inventors: Mariano Cuerda, Novi, MI (US); Tsutomu Yamada, Novi, MI (US); Tetsuya Yoshino, Tokyo (JP); Thanh Nguyen, Novi, MI (US)

(73) Assignee: YKK CORPORATION (JP)

( * ) Notice: Subject to any disclaimer, the term of this patent is extended or adjusted under 35 U.S.C. 154(b) by 311 days.

(21) Appl. No.: 17/616,579

(22) PCT Filed: Apr. 3, 2020

(86) PCT No.: PCT/IB2020/053222
§ 371 (c)(1),
(2) Date: Dec. 3, 2021

(87) PCT Pub. No.: WO2020/245670
PCT Pub. Date: Dec. 10, 2020

(65) Prior Publication Data
US 2022/0242287 A1    Aug. 4, 2022

Related U.S. Application Data

(60) Provisional application No. 62/858,255, filed on Jun. 6, 2019.

(51) Int. Cl.
*B60N 2/58* (2006.01)
*F16B 2/22* (2006.01)

(52) U.S. Cl.
CPC .............. *B60N 2/5825* (2013.01); *F16B 2/22* (2013.01)

(58) Field of Classification Search
CPC ................................ B60N 2/5825; F16B 2/22
See application file for complete search history.

(56) References Cited

U.S. PATENT DOCUMENTS

| 9,555,728 | B2 | 1/2017 | Galbreath et al. |
| 11,772,533 | B2 | 10/2023 | Yonezawa et al. |
| 2016/0264030 | A1* | 9/2016 | Saiga ................... B60N 2/5825 |
| 2016/0280105 | A1 | 9/2016 | Sato et al. |

(Continued)

FOREIGN PATENT DOCUMENTS

| DE | 4219656 | 12/1992 |
| DE | 20105940 U1 * | 7/2001 ................ F16L 3/04 |

(Continued)

OTHER PUBLICATIONS

Cuerda, Mariano: International Preliminary Report on Patentability for PCT/IB2020/053222, filed Apr. 3, 2020, mailed Dec. 16, 2021, 7 pgs.

(Continued)

*Primary Examiner* — Anthony D Barfield
(74) *Attorney, Agent, or Firm* — Taylor English Duma LLP

(57) ABSTRACT

A clip for securing a cover to a base includes a chuck defining a suspender retention cavity, the suspender retention cavity sized and configured to receive a suspender attached to the cover; a first leg extending from the chuck and including a first barb, the first barb extending outwardly with respect to a centerline axis of the clip; and a second leg extending from the chuck and including a second barb, the second barb extending outwardly with respect to the centerline axis of the clip.

21 Claims, 22 Drawing Sheets

(56) References Cited

U.S. PATENT DOCUMENTS

| | | |
|---|---|---|
| 2017/0057807 A1 | 3/2017 | Agonia et al. |
| 2018/0162719 A1 | 6/2018 | Matsumura et al. |
| 2018/0304782 A1* | 10/2018 | Yoshino ............... B60N 2/5825 |
| 2019/0104859 A1 | 4/2019 | Murasaki et al. |
| 2019/0142181 A1 | 5/2019 | Matsumura et al. |
| 2019/0275918 A1 | 9/2019 | Mayumi et al. |
| 2021/0053472 A1 | 2/2021 | Eldridge et al. |
| 2021/0137279 A1 | 5/2021 | Nanbu et al. |
| 2023/0264615 A1 | 8/2023 | Yonezawa et al. |

FOREIGN PATENT DOCUMENTS

| | | |
|---|---|---|
| JP | S5512885 U | 1/1980 |
| JP | S63015983 A | 1/1988 |
| JP | 2006220180 | 8/2006 |
| JP | 20070275557 A | 10/2007 |
| JP | 2013165535 | 8/2013 |
| JP | 2015048050 | 3/2015 |
| JP | 6399917 | 10/2018 |

OTHER PUBLICATIONS

Cuerda, Mariano: International Search Report and Written Opinion for PCT/IB2020/053222, filed Apr. 3, 2020, mailed Jun. 30, 2020, 8 pgs.

Microfilm of the specification and drawings annexed to the written application of Japanese Utility Model Application No. 097147/1978 (laid-open No. 012885/1980) (Toyo Kogyo Co., Ltd) Jan. 26, 1980 (Jan. 26, 1980) description p. 7 lines 15-17, Fig. 9 corresponds with Foreign Patent Reference JPS5512885U cited herewith.

YKK Corporation; International Search Report and Written Opinion for PCT/JP2023/005874, filed Feb. 17, 2023, mailed May 16, 2023, 21 pgs.

Yonezawa, Seiichiro; Notice of Allowance for U.S. Appl. No. 17/675,638, filed Feb. 18, 2022, mailed May 30, 2023, 17 pgs.

* cited by examiner

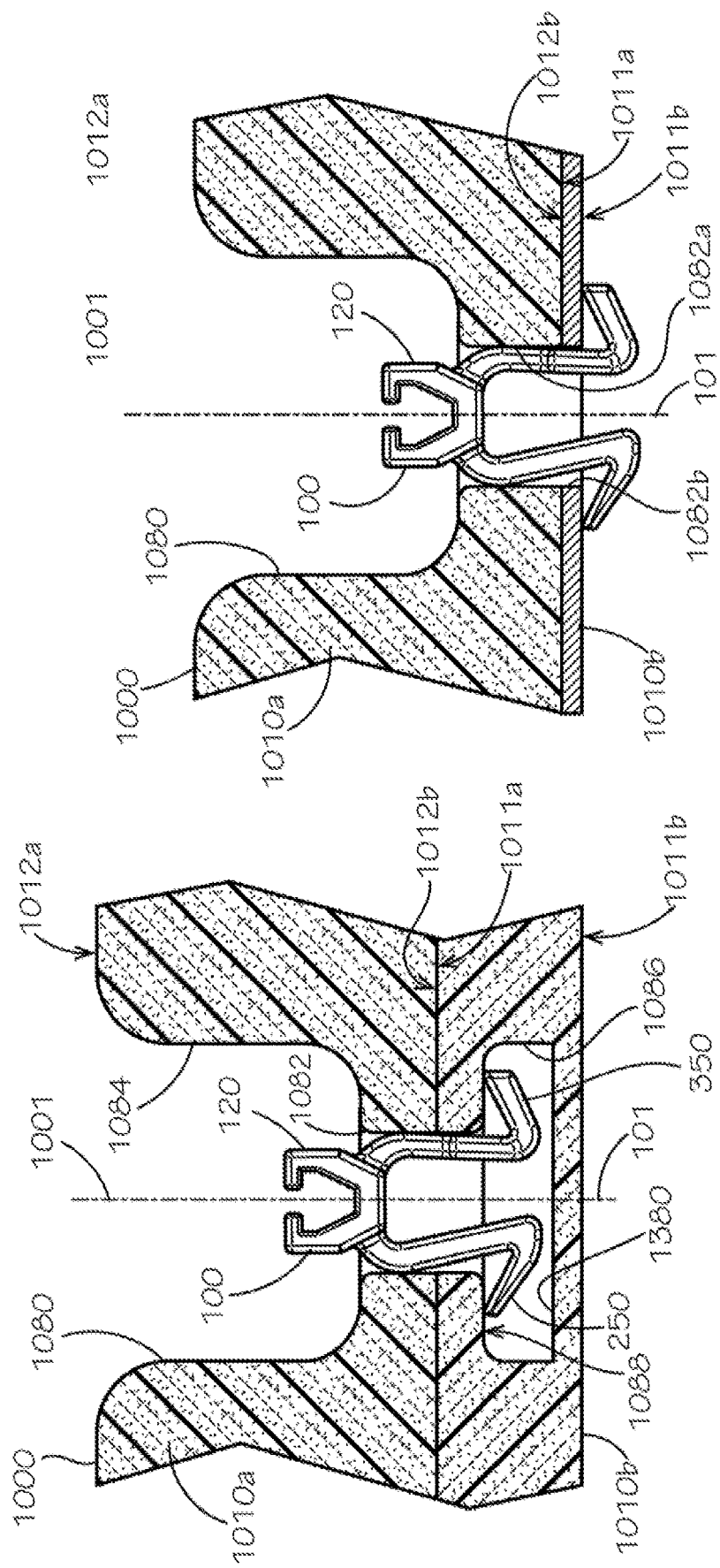

CLIP FOR UPHOLSTERY COVER

TECHNICAL FIELD

Field of Use

This disclosure relates to fasteners. More specifically, this disclosure relates to fastening clips for vehicle upholstery.

Related Art

Many vehicles include seating for drivers or passengers or both or include upholstered surfaces incorporating a separate base, which can be a cushion, and a cover. While some vehicles include seating that does not require the separate base or an upholstery cover, many vehicles include both for comfort, aesthetics, and for other reasons. A manufacturer typically uses some kind of fastener to secure upholstery—whether fabric, leather, or some other material—in place around the base. Some fastening methods involve the use of wires or other fasteners embedded inside foam cushions, which can require a greater number of parts and greater design complexity overall and can limit the variety of materials available to form a body of the base. Some bases using other materials and manufacturing methods can require new assembly methods and even new fasteners.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

In one aspect, disclosed is a clip for securing a cover to a base, the clip comprising: a chuck defining a suspender retention cavity, the suspender retention cavity sized and configured to receive a suspender attached to the cover; a first leg extending from the chuck and comprising a first barb, the first barb extending outwardly with respect to a centerline axis of the clip; and a second leg extending from the chuck and comprising a second barb, the second barb extending outwardly with respect to the centerline axis of the clip.

In a further aspect, a clip can comprise a chuck; a first leg extending from the chuck; and a second leg extending from the chuck.

Various implementations described in the present disclosure may comprise additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The accompanying drawings, which are incorporated in and constitute a part of this specification, illustrate several aspects of the disclosure and together with the description, serve to explain various principles of the disclosure. The drawings are not necessarily drawn to scale. Corresponding features and components throughout the figures may be designated by matching reference characters for the sake of consistency and clarity.

FIG. 13 is an end view of the clip and the base of FIG. 10 after installation of the clip into the base in accordance with another aspect of the current disclosure.

FIG. 14 is an end view of the clip and the base of FIG. 10 after installation of the clip into the base in accordance with yet another aspect of the current disclosure.

DETAILED DESCRIPTION

Figure 1:
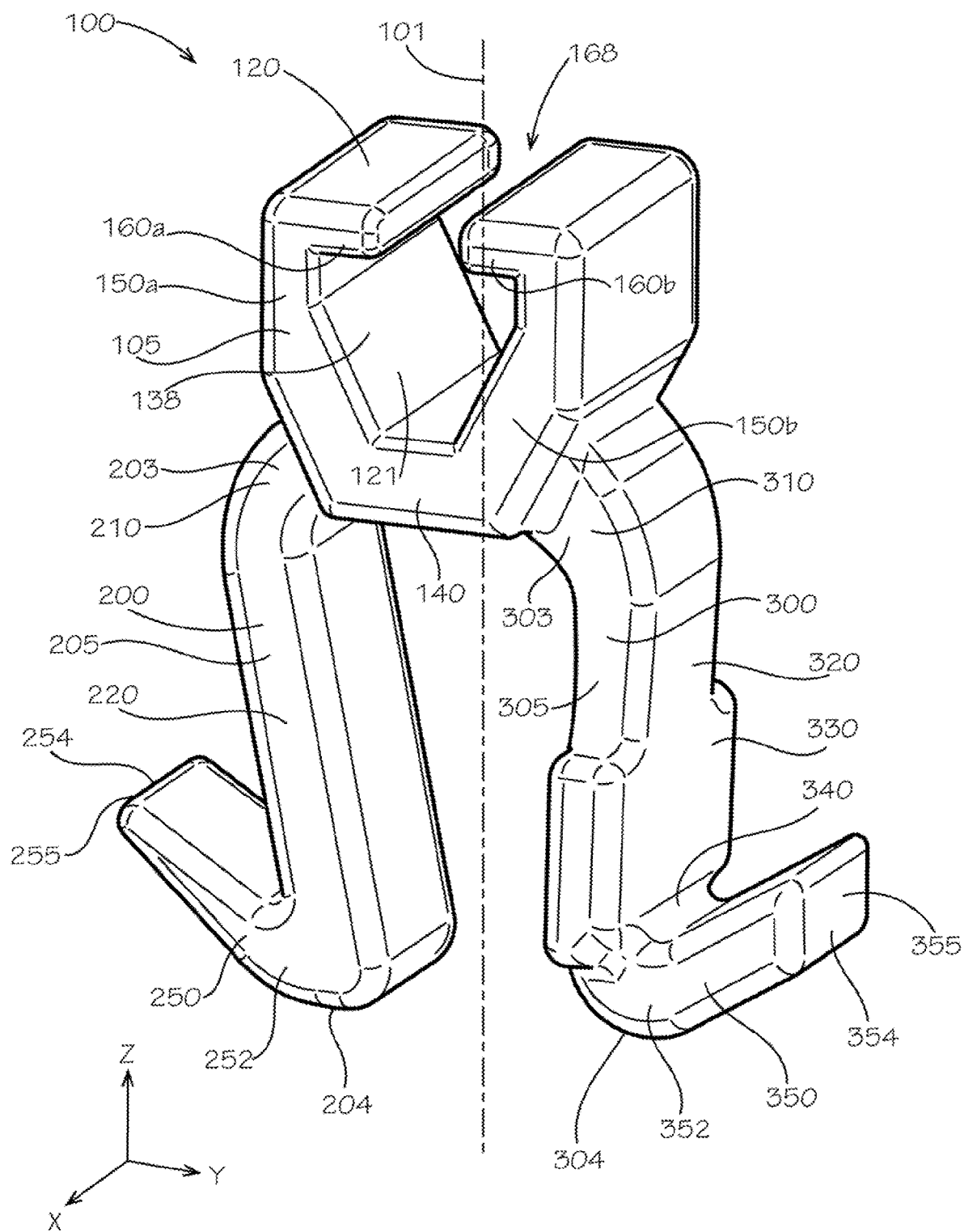
FIG. 1 is a top perspective view of a clip in accordance with one aspect of the current disclosure.

The present disclosure can be understood more readily by reference to the following detailed description, examples, drawings, and claims, and their previous and following description. However, before the present devices, systems, and/or methods are disclosed and described, it is to be understood that this disclosure is not limited to the specific devices, systems, and/or methods disclosed unless otherwise specified, as such can, of course, vary. It is also to be understood that the terminology used herein is for the purpose of describing particular aspects only and is not intended to be limiting.

The following description is provided as an enabling teaching of the present devices, systems, and/or methods in their best, currently known aspect. To this end, those skilled in the relevant art will recognize and appreciate that many changes can be made to the various aspects described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to a quantity of one of a particular element can comprise two or more such elements unless the context indicates otherwise. In addition, any of the elements described herein can be a first such element, a second such element, and so forth (e.g., a first widget and a second widget, even if only a "widget" is referenced).

Ranges can be expressed herein as from "about" one particular value, and/or to "about" another particular value. When such a range is expressed, another aspect comprises from the one particular value and/or to the other particular value. Similarly, when values are expressed as approximations, by use of the antecedent "about" or "substantially," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance may or may not occur, and that the description comprises instances where said event or circumstance occurs and instances where it does not.

The word "or" as used herein means any one member of a particular list and also comprises any combination of members of that list. The phrase "at least one of A and B" as used herein means "only A, only B, or both A and B"; while the phrase "one of A and B" means "A or B."

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

A cover fastening clip 100 is described below on the basis of a coordinate axis of X-Y-Z directions shown in the figures. An X-axis direction can be referred to as a left-right or horizontal direction. For example, as shown in FIG. 1, the X-axis direction coincides with an extension direction of a suspender 700 (shown in FIG. 7) disposed in a suspender retention cavity 138 (shown in FIG. 1) of a clip 100 (shown in FIG. 1).

A Y-axis direction is orthogonal to the X-axis direction (left-right direction) and a Z-axis direction (upper-lower direction) and can also be referred to as a front-rear direction. A surface of a structural element that is parallel with the front-rear direction can be referred to as a lateral side.

An upper-lower direction is the Z-axis direction, which is orthogonal to the X-axis direction and to the Y-axis direction and typically coincides with a height direction of the clip 100. For example, a direction along which the suspender 700 can be inserted into a gap 168 (shown in FIG. 1) of the clip 100 and locked into the clip 100 can be referred to as the Z-axis direction. Also, the upper-lower direction can coincide with a direction perpendicular to a surface of a cover 1210 (shown in FIG. 12) stretched on a base 1000 (shown in FIG. 12).

In one aspect, a cover fastening clip and associated methods, systems, devices, and various apparatuses are disclosed herein. In one aspect, the clip can comprise a chuck and a pair of legs.

FIGS. 1-17 shows a cover fastening clip 100 in accordance with one aspect of the current disclosure. As shown in the top perspective view of FIG. 1, the clip 100 can comprise a chuck 120, a first leg 200, and a second leg 300. The clip 100 and more specifically the chuck 120 can define a front end or first end 105 and a rear end or second end 106 (shown in FIG. 4). The clip 100 and more specifically the chuck 120 can further define a centerline axis 101 along which a suspender 700 (shown in FIG. 7) can be inserted.

The chuck 120 can comprise a chuck base 140, a pair of chuck walls 150a,b extending from the chuck base 140, and a pair of retaining flanges 160a,b extending from the respective chuck walls 150a,b. The chuck 120 can define a suspender retention cavity 138 and can define an inner surface 121. The retaining flange 160a and the retaining flange 160b can define a gap 168 therebetween, which can be configured for receipt of the aforementioned suspender 700.

The first leg 200 can extend from the chuck 120 and can define a proximal end 203 proximate to the chuck 120 and a distal end 204 distal from the chuck 120. More specifically, the first leg 200 can comprise a first portion 210 extending from the chuck 120 and a second portion 220 extending from and joined to the first portion 210. The first portion 210 and the second portion 220 can together form a main portion. As shown, the first portion 210 can be curved when viewed from the end of the clip 100 and along the X-axis direction. The first leg 200 can comprise a barb 250, which can be a third portion of the first leg 200, extending from the main portion of the first leg 200—and, more specifically, from the second portion 220—and from the distal end 204 of the first leg 200. The barb 250 can extend outwardly with respect to the centerline axis 101 of the clip 100. When viewed from at least one direction, i.e., along at least the X-axis direction, the barb 250 can be tapered from a base 252—where it extends from the second portion 220 of the first leg 200—to a tip 254. The barb 250 of the first leg 200 can define an end surface 255 at the tip 254. The end surface 255 can be rounded or flat. The first leg 200 can define a primary width 207 (shown in FIG. 3) measured from a front end or first end 205 to a rear end or second end 206 (shown in FIG. 3).

The second leg 300 can extend from the chuck 120 and can define a proximal end 303 proximate to the chuck 120 and a distal end 304 distal from the chuck 120. More specifically, the second leg 300 can comprise a first portion 310 extending from the chuck 120 and a second portion 320 extending from and joined to the first portion 310. The first portion 310 and the second portion 320 can together form a main portion. As shown, the first portion 310 can be curved when viewed from the end of the clip 100 and along the X-axis direction. The second leg 300 can comprise a barb 350, which can be a third portion of the second leg 300, extending from the main portion of the second leg 300—and, more specifically, from the second portion 320 of the second leg 200—and from the distal end 304 of the second leg 300. The barb 350 can extend outwardly from the centerline axis 101 of the clip 100. When viewed from at least one direction such as the front, i.e., along at least the X-axis direction, the barb 350 can define a constant thickness from a base 352 where it extends from the second portion 320 of the second leg 300 to a tip 354. The barb 350 of the second leg 300 can define an end surface 355 at the tip 354 that can be rounded or flat or, as shown, both rounded and flat in some aspects. The second leg 300 can define a primary width 307 (shown in FIG. 4) measured from a front end or first end 305 to a rear end or second end 306 (shown in FIG. 4).

The chuck walls 150a,b can be angled with respect to the chuck base 140 of the chuck 120. To match the shape of the suspender 700 (shown in FIG. 7), an angled portion of the chuck walls 150a,b can be angled with respect to the centerline axis 101, and a vertical portion of the chuck walls 150a,b can be parallel to the centerline axis 101. As shown clearly in FIG. 2, the first leg 200 can extend from the angled portion of the chuck wall 150a, and the second leg 300 can extend from the angled portion of the chuck wall 150b.

The main portion of the second leg 300—or, more specifically, the second portion 320—can comprise a wider portion 330. The wider portion 330 can define a secondary width 337 (shown in FIG. 4) measured from the first end 305—as defined by the wider portion 330—to the second end 306 (shown in FIG. 4). As the name of the feature implies and for reasons to be described below, the secondary width 337 of the wider portion 330 can be wider or greater than the primary width 307 of the second leg 300.

The second leg 300 can define a transition area 340 proximate to the barb 350 between the main portion—or, more specifically, the second portion 320—and the barb 350. The transition area 340 can comprise or define an internal chamfer defining a flat surface or a fillet (i.e., an inside radius) defining a curved surface and can in any case be configured to receive a tool 900 (shown in FIG. 9), which can define a complementary or matching shape. As shown, the transition area 340 can define a radius R340 (shown in FIG. 2).

Figure 2:
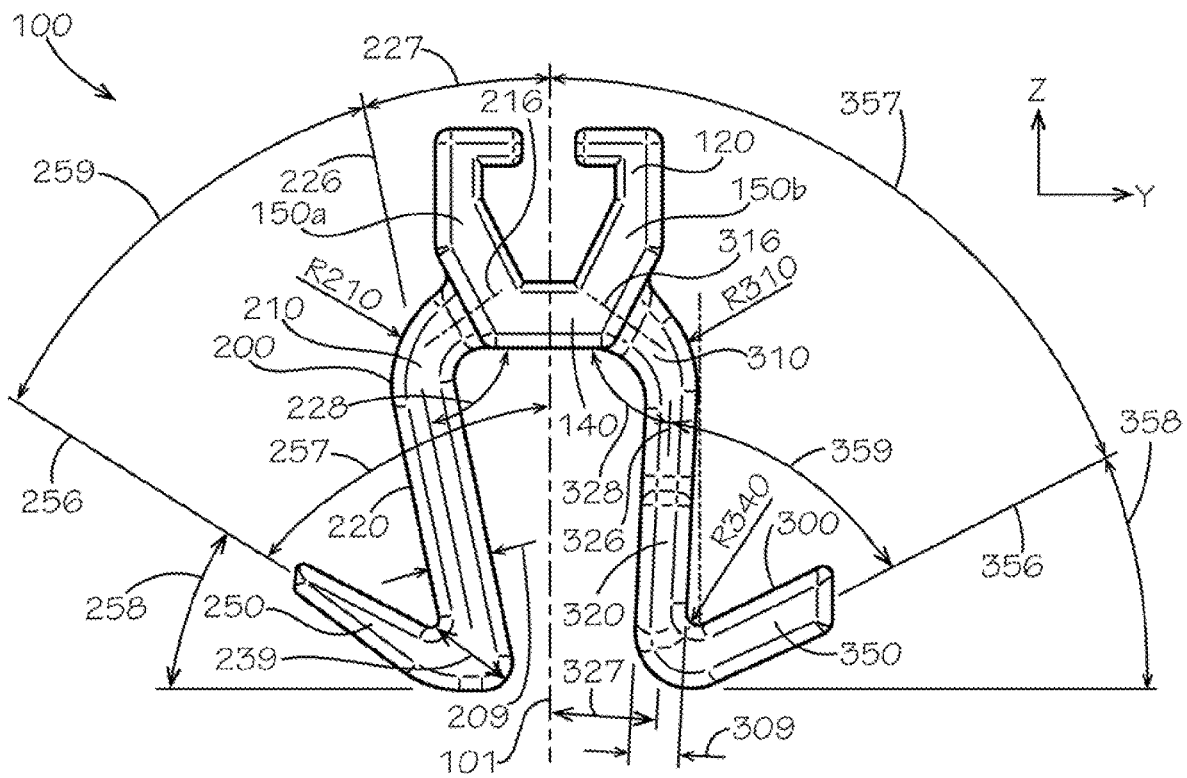
FIG. 2 is an end view or front view of the clip of FIG. 1.

FIG. 2 is an end view of the clip 100. As shown, the first portion 210 of the first leg 200 can be curved or can comprise a curved section defining an outside radius R210. The first portion 210 can extend from the chuck wall 150a or from the chuck base 140 or from an intersection of the chuck wall 150a and the chuck base 140. The second portion 220 can be straight or comprise a straight section extending downwardly from the first portion 210. Where the first portion 210 attaches to the chuck 120, a centerline 216 of the first portion 210 can be angled with respect to adjacent surfaces of the chuck 120. The second portion 220 of the first leg 200 can be angled with respect to the first portion 210 of the first leg 200. A centerline 226 of the second portion 220 can be angled with respect to the centerline axis 101 by a leg angle 227 and can be angled with respect to an outer surface of the chuck base 140 by a leg angle 228. A centerline 256 of the barb 250 can be angled with respect to the centerline axis 101 by an angle 257, with respect to a horizontal orientation or the Y-axis direction by an angle 258, and with respect to the centerline 226 of the second portion 220 by an angle 259. Each of the angles referenced including the leg angles 227,228 and the angles 257,258,259 but especially the leg angle 228 can be acute angles, i.e., angles measuring less than 90 degrees.

Similarly, the first portion 310 of the second leg 300 can be curved or can comprise a curved section defining an outside radius R310. The first portion 310 can extend from the chuck wall 150b or from the chuck base 140 or from an intersection of the chuck wall 150b and the chuck base 140. The second portion 320 can be straight or comprise a straight section extending downwardly from the first portion 310. Where the first portion 310 attaches to the chuck 120, a centerline 316 of the first portion 310 can be angled with respect to adjacent surfaces of the chuck 120. The second portion 320 of the second leg 300 can be angled with respect to the first portion 310 of the second leg 300. A centerline 326 of the second portion 320 can be angled with respect to the centerline axis 101 by a leg angle 327 and can be angled with respect to an outer surface of the chuck base 140 by a leg angle 328. A centerline 356 of the barb 350 can be angled with respect to the centerline axis 101 by a barb angle 357, with respect to a horizontal orientation or the Y-axis direction by a barb angle 358, and with respect to the centerline 326 of the second portion 320 by a barb angle 359. Each of the angles referenced, including the leg angles 327,328 and the barb angles 357,358,359 but especially the leg angle 328 can be acute angles.

As shown, the leg angle 328 can be greater than the leg angle 228. In some aspects, the barb angles 258,358 specifically can measure 20 degrees. In some aspects, the barb angles 258,358 can measure 25 degrees. In some aspects, the barb angles 258,358 can measure 30 degrees. In various aspects, the barb angles 258,358 can measure another non-zero angle and can measure in a range of at least any of the recited angles or between and including the recited angles. In some aspects, as described above, each of the aforementioned angles are described in reference to a centerline of various structural elements. In other aspects, the same descriptions can be true with the angles as measured to either opposing surface of the structural elements.

In some aspects, for reasons to be described below, a leg thickness 309 of the second leg 300 can be thinner than a leg thickness 209 of the first leg 200. Furthermore, to increase rigidity and strength, a portion of the first leg 200 at an intersection between the second portion 220 and the barb 250 can define a maximum thickness 239 that is greater than the leg thickness 209, and a portion of the second leg 300 at an intersection between the second portion 320 and the barb 350 can define a maximum thickness 339 (shown in FIG. 7) that is greater than the leg thickness 309.

Figure 3:
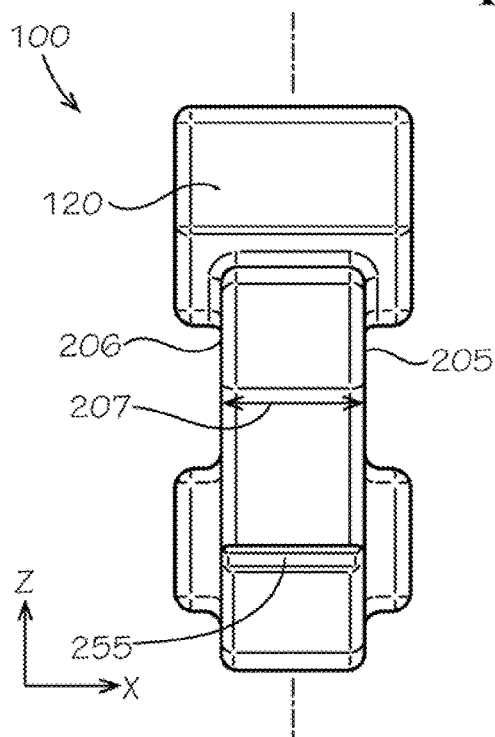
FIG. 3 is a first side view of the clip of FIG. 1.
Figure 4:
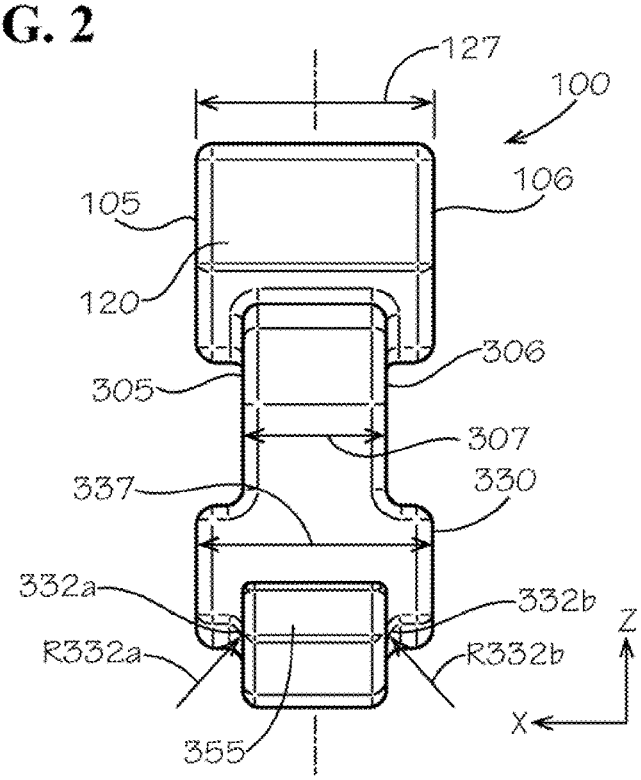
FIG. 4 is a second side view of the clip of FIG. 1, wherein the second side view is opposite from the first side view.

FIG. 3 is a first side view of the clip 100, and FIG. 4 is a second side view of the clip 100. In some aspects, as shown, the secondary width 337 of the wider portion 330 of the second leg 300 can be the same as a width 127 of the chuck 120. In other aspects, the secondary width 337 can be greater than or less than the width 127. Accordingly, the width 127 of the chuck 120 can be greater than the primary width 207 of the second portion 220 of the first leg and also greater than the primary width 307 of the second portion 320 of the second leg 300. As shown in FIG. 4, proximate to a bottom end of the wider portion 330 of the second leg 300, the second leg 300 can define transition areas 332a,b, which can define respective internal chamfers or radii R332a,b.

Figure 5:
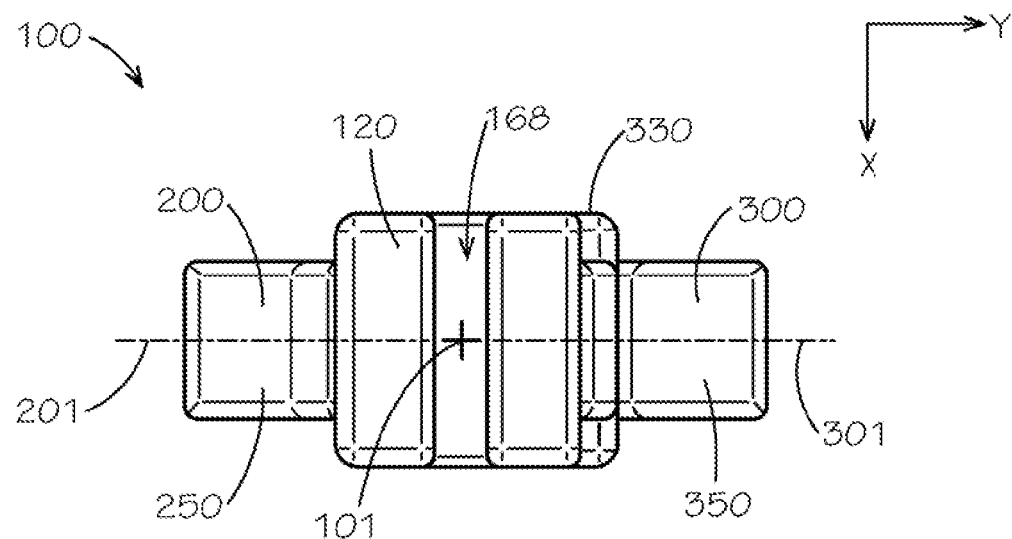
FIG. 5 is a top plan view of the clip of FIG. 1.
Figure 6:
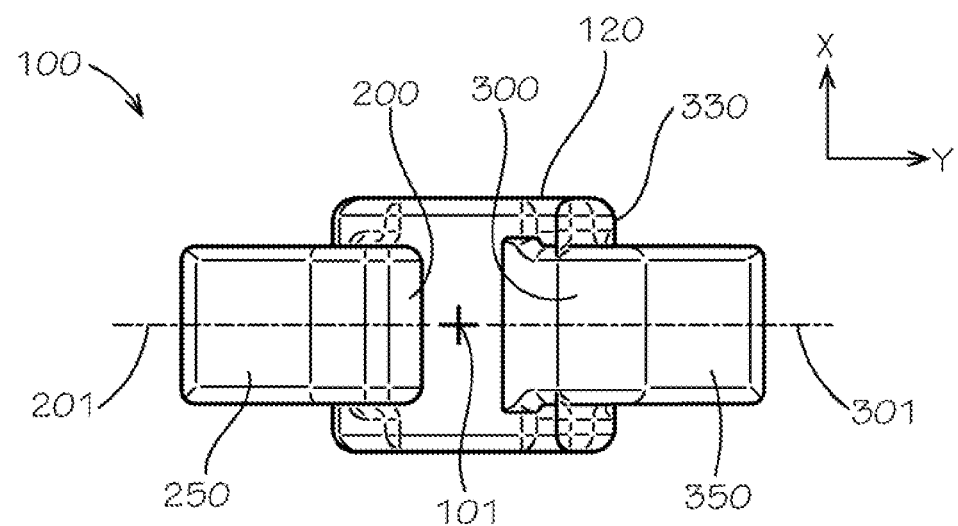
FIG. 6 is a bottom plan view of the clip of FIG. 1.

FIG. 5 is a top plan view of the clip 100, and FIG. 6 is a bottom plan view of the clip 100. As shown, a centerline 201 of the first leg 200 and a centerline 301 of the second leg 300 can intersect the centerline axis 101 of the clip 100. Moreover, the clip 100 as viewed can be symmetric about the centerlines 201,301. The clip 100 can define tapered or drafted surfaces in one or more of the X-axis, Y-axis, or Z-axis directions to facilitate manufacturing such as by a process of injection molding of the clip 100, which can be aided by the incorporation of draft angles.

Figure 7:
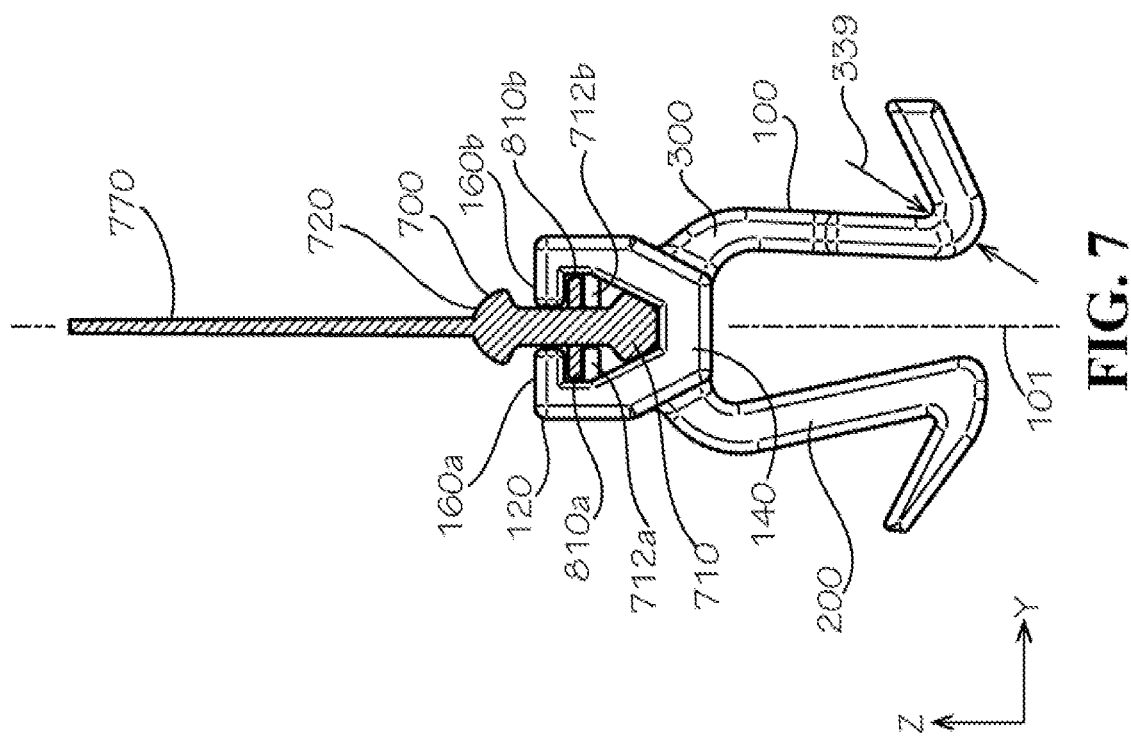
FIG. 7 is a partial sectional end view of the clip of FIG. 1 with a suspender assembled therein taken from line 7-7 of FIG. 8 and with only the suspender shown in cross-section.

FIG. 7 is an end view of the clip 100 with a suspender 700 assembled therein, which can be, for example and without limitation, a suspender like that available as part of an EZCLIP® fastening product from YKK Corporation. The clip 100 can flex or deform between an unflexed condition (as shown) and a flexed condition (not shown). This flexing can occur due to outward forces exerted by the suspender 700 on the retaining flanges 160a,b of the chuck 120 during assembly of the suspender 700 with the clip 100 being able to open up or increase a size of the gap 168 (shown in FIG. 1) sufficiently large to allow passage of the suspender 700. A tapered body 710 of the suspender 700 and side surfaces defined thereby can push against the retaining flanges 160a,b and specifically against the innermost edges, which can be chamfered or rounded. As shown, the body 710 of the suspender 700 can be received within the suspender retention cavity 138 (shown in FIG. 1) and once so received can be kept in contact with the retaining flanges 160a,b by the chuck base 140 of the chuck 120. A flange 720 of the suspender 700 can ease insertion of the suspender 700 into the chuck 120 by providing a surface on either side of a tape 770 of the suspender 700 against which one can more easily push the suspender 700.

In some aspects, as shown, tabs 712a,b can extend from the inner surface 121 (shown in FIG. 1) of the chuck 120. The tabs 712a,b can be sized and otherwise configured to engage any one of a plurality of recessed portions 810a,b of the suspender 700, thereby fixing a lateral position (i.e., in the X-axis direction) of the suspender with respect to the clip 100.

Figure 8:
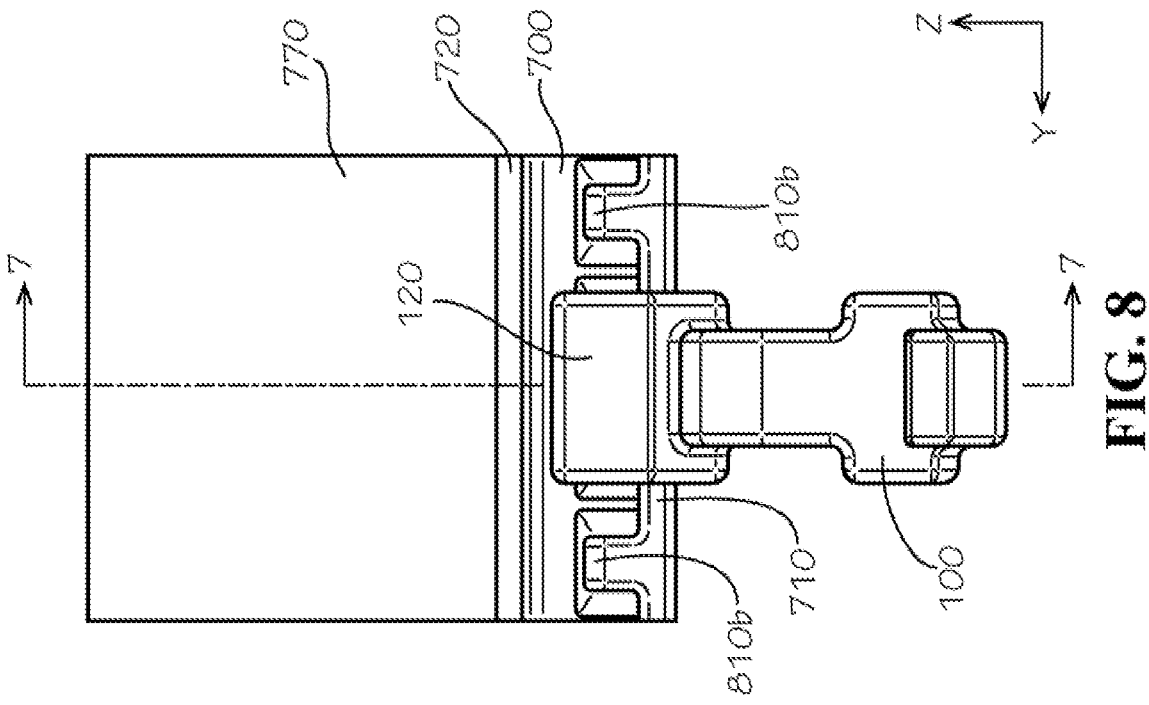
FIG. 8 is a side view of the clip and the suspender of FIG. 7.

FIG. 8 is a side view of an assembly of the clip 100 and suspender 700 showing the suspender locked in the X-axis direction and also in the Z-axis direction inside the suspender retention cavity 138 (shown in FIG. 1). Because any one of a plurality of the recesses 810 can be engaged with the tabs 712a,b (shown in FIG. 7), the lateral position of the suspender 700 in the clip 100 can be set as desired but once the suspender 700 is inserted into the chuck 120 of the clip 100 it can generally be "locked" or fixed in that position.

Figure 9:
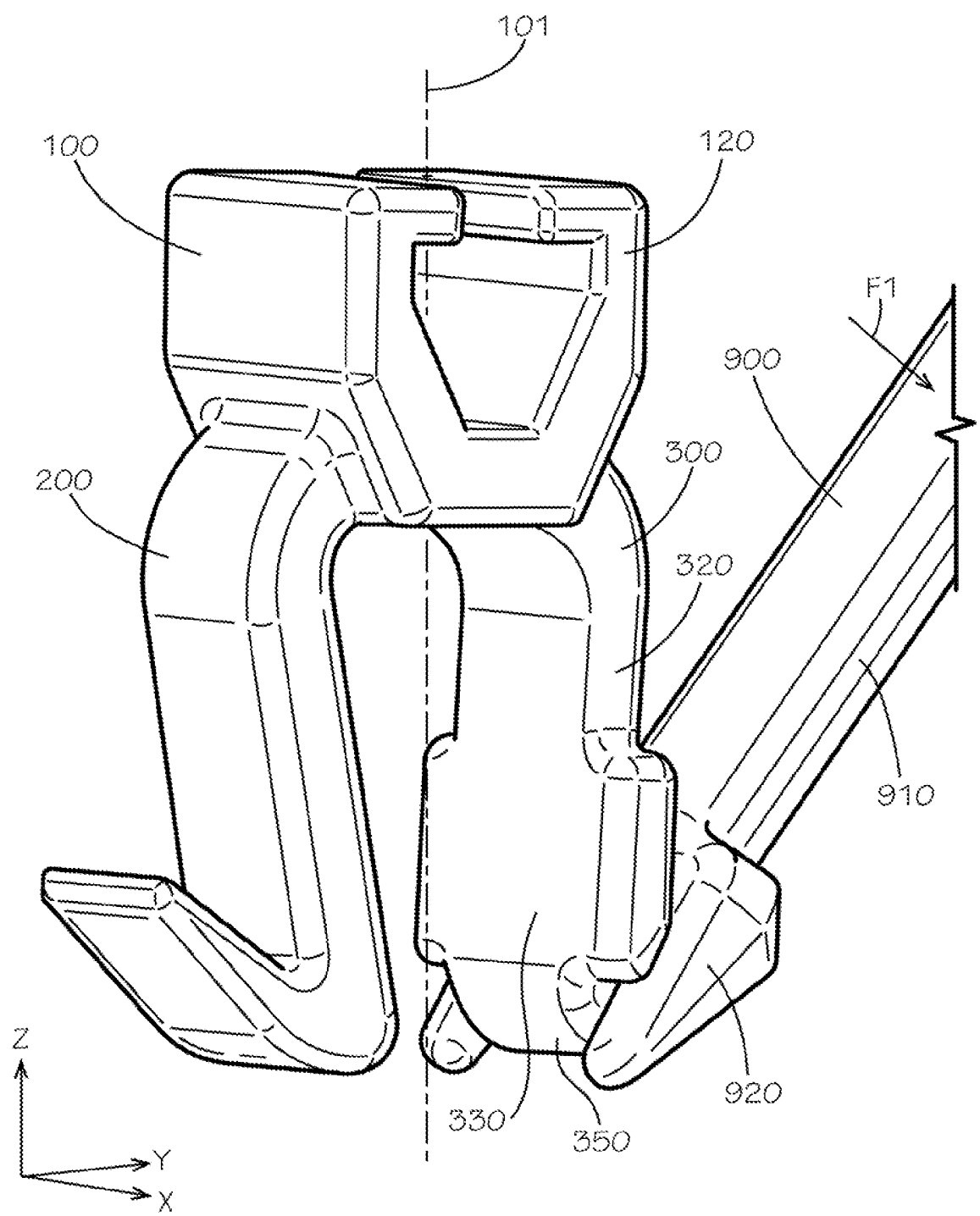
FIG. 9 is a side perspective view of the clip of FIG. 1 with an installation tool engaged therewith.

FIG. 9 is a side perspective view of the clip 100 with an installation tool 900 engaged therewith. As shown, the installation tool 900 can comprise a shaft 910 and a fork-shaped engagement end 920, which can be sized and shaped to fit a mating portion of the second leg 300 and more particularly the second portion 320 and the barb 350. Because generally upward-facing surfaces of the engagement end 920 of the installation tool 900 can contact the wider portion 330 or the barb 350 of the second leg 300 or both features together, the installation tool 900 or a finger of an assembly operator or other user (not shown) can be used to manipulate the orientation and position of the clip 100 during its installation. More specifically, a rotation of the installation tool 900 about the X-axis direction by a force F1, for example, can cause a corresponding rotation of the clip 100 about the X-axis direction because the installation tool 900 can contact the barb 350 and the wider portion 330 of the leg 300 and effectively cause the installation tool 900 and the clip 100 to rotate together.

Figure 10:
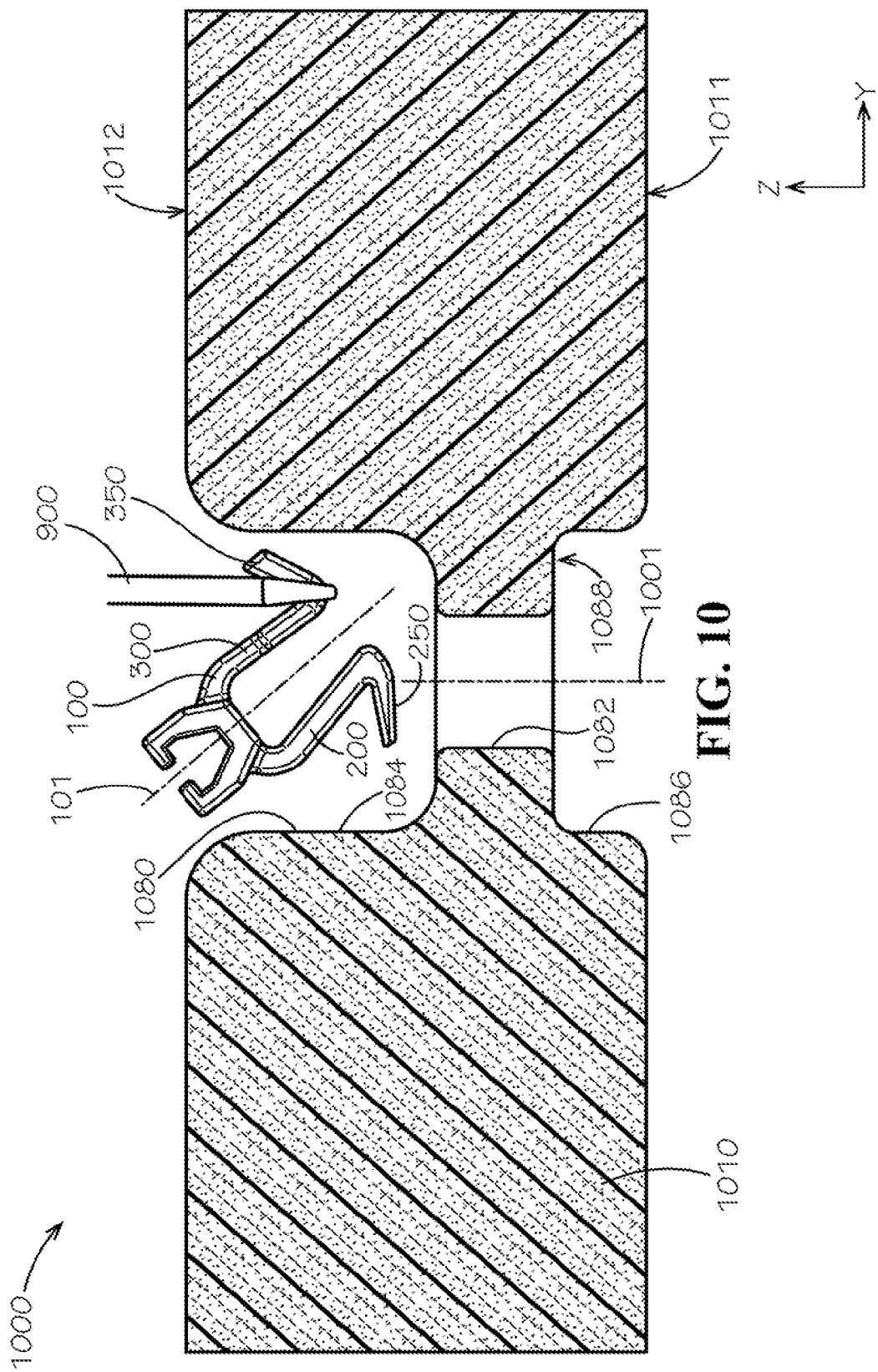
FIG. 10 is an end view of the clip and a base before installation of the clip into the base with the installation tool of FIG. 9.

FIG. 10 is an end view of the clip 100 and the base 1000, which can be or can comprise, for example and without limitation, a cushion such as a seat bottom cushion of a vehicle seat (not shown) or a seat back cushion of the vehicle seat, before installation of the clip 100 into the base 1000 with the installation tool 900 (or the finger of an operator or user) but which need not be part of the vehicle seat and need not be compressible or otherwise deformable. The base 1000 can comprise a body 1010 defining a lower surface 1011 and an upper surface 1012 and further defining a plurality of holes 1080 extending from the lower surface 1011 to the upper surface 1012. In some aspects, as shown, an intermediate portion 1082 of each hole 1080 defined in the base 1000 can have a smaller width or diameter than an upper portion 1084 of the same hole 1080 defined in the upper surface 1012 or a lower portion 1086 of the same hole 1080 defined in the lower surface 1011. In various aspects, the hole 1080 can be square or circular or some other shape to accommodate one shape or another of the clip 100. In some aspects, as shown, the upper portion 1084 can be a trench extending between multiple holes 1080 and allowing an extended length of the suspender 700 (shown in FIG. 12) to be received therein. In some aspects, the lower surface 1011 can be a first surface and the upper surface 1012 can be a second surface without the lower surface 1011 being below the upper surface 1012 or any other portion of the base 1000 or the upper surface 1012 being above the lower surface 1011 or any other portion of the base 1000.

In any case, a step or variation in width or diameter between the intermediate portion 1082 and at least the lower portion 1086 of the hole 1080 can provide a shoulder surface 1088 against which the barbs 250,350 of respective legs 200,300 of the clip 100 can catch and hold and thereby positively maintain the position of the clip 100 after assembly. The centerline axis 101 of the clip 100 can be angled with respect to a central axis 1001 of the hole 1080 such that the barb 250 first enters and then clears the intermediate portion 1082. For example and without limitation, the centerline axis 101 of the clip 100 can be angled with respect to a central axis 1001 of the hole 1080 by at least the barb angle 258 shown in FIG. 2 and can be or be aligned with a hole centerline.

Figure 11:
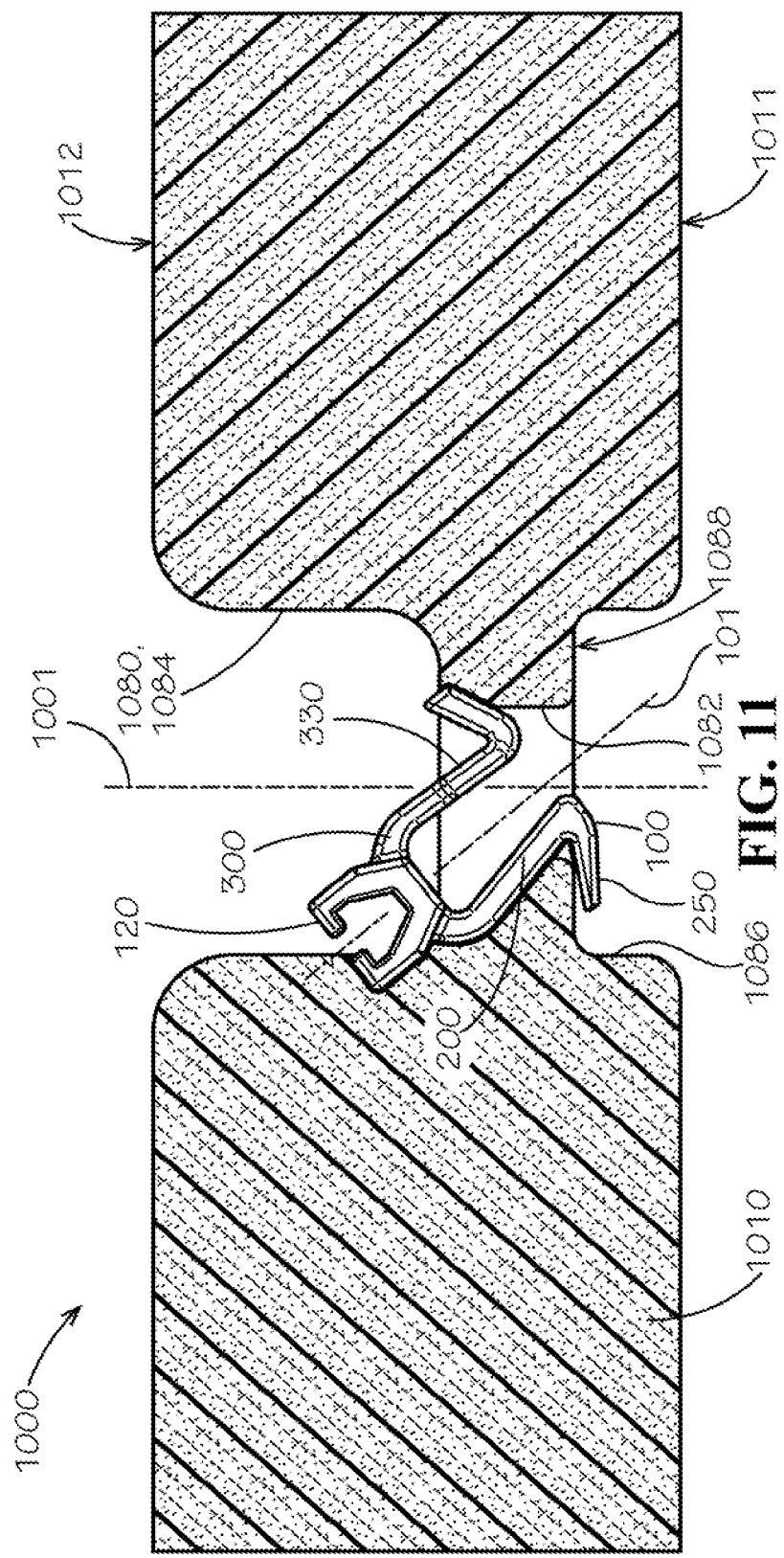
FIG. 11 is an end view of the clip and the base of FIG. 10 during installation of the clip into the base.

FIG. 11 is an end view of the clip 100 and the base 1000 during installation of the clip 100 into the base 1000. As shown, the barb 250 of the first leg 200 of the clip 100 can extend through the intermediate portion 1082 of the hole 1080 and hook around the intermediate portion 1082 and the surface 1088. The presence of the remainder of the first leg 200, the chuck 120, and the barb 350 of the second leg 300 can resist further insertion of the clip 100 from the top. Such resistance can be overcome due to the deformable nature of the body 1010 of the base 1000 and by continued use of the installation tool 900 or pressure against the wider portion 330 of the second leg 300 by a finger of the aforementioned assembly operator. In various aspects where the leg thickness 209 (shown in FIG. 2) of the first leg 200 is greater than the leg thickness 309 (shown in FIG. 2) of the second leg 300, the increased rigidity of the first leg 200 relative to that of the second leg 300 can result in the first leg 200 remaining in an extending position inside the hole 1080 and specifically the intermediate portion 1082. The barb 250 can catch or be caught on the surface 1088 even as the second leg 300 can flex or be caused to flex in order to pass through the hole 1080 and specifically the intermediate portion 1082.

Figure 12:
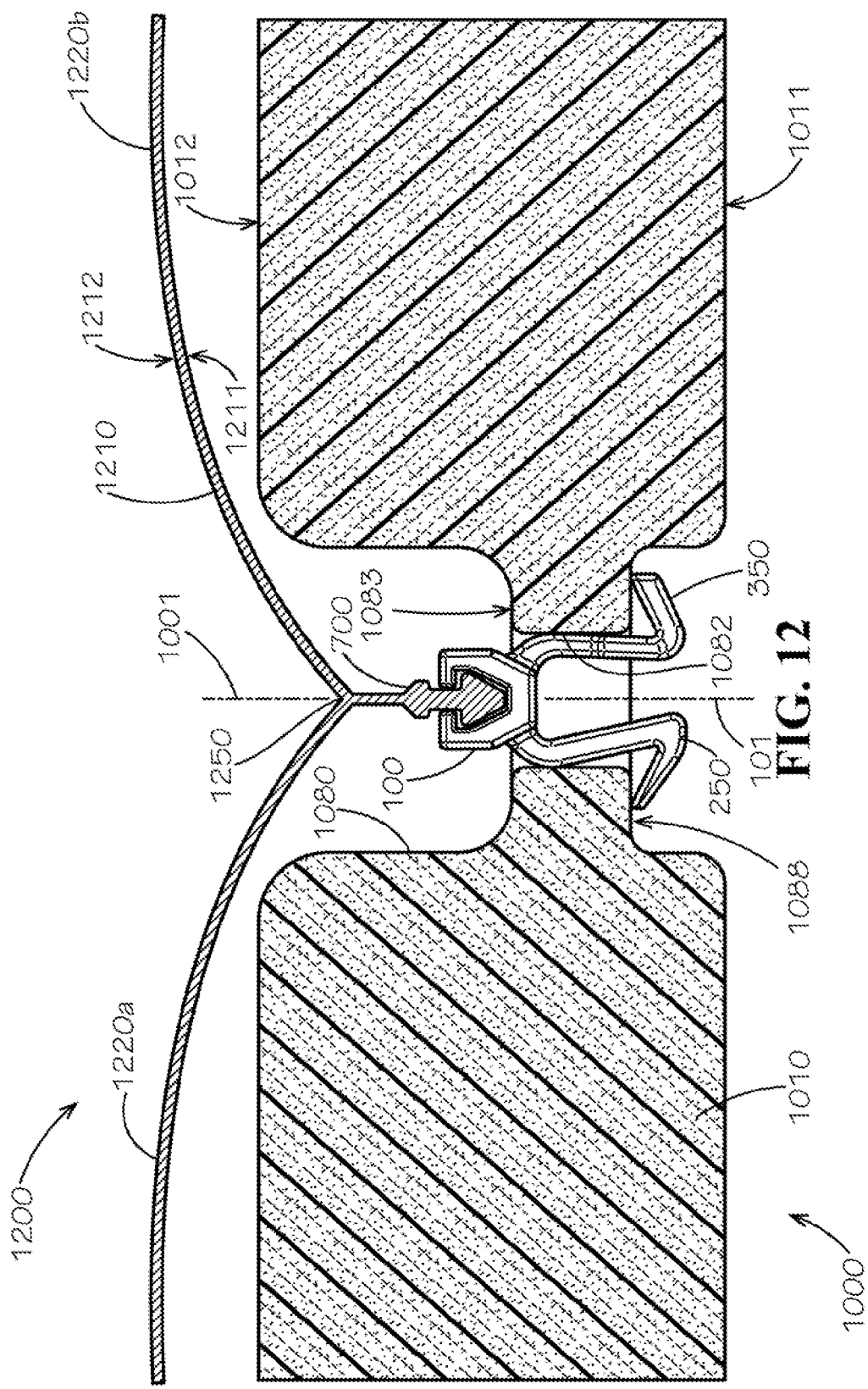
FIG. 12 is an end view of the clip and the base of FIG. 10 after installation of the clip into the base and taken from line 12-12 of FIG. 15.

FIG. 12 is an end view of the clip 100 and the base 1000 after installation of the clip 100 into the base 1000 and after installation of the suspender 700 into the clip 100, thereby forming an assembly 1200. In some aspects, although the suspender 700 is not shown assembled to the clip 100 in FIGS. 10 and 11 for clarity, the clip 100—or a plurality of clips 100—can be attached to the suspender 700 at desired locations only before installation of the clip 100—or clips 100—into the base 1000. As shown in a simplified form, the suspender 700 can be secured to a cover 1210 with, for example and without limitation, one or more sewn joints, which can define one or more seams 1250. The cover 1210 can be a seat cover. The cover 1210 can define an inner surface 1211, which can face toward the base 1000, and an outer surface 1212, which can face away from or in a direction opposite from the base 1000. The cover 1210 can be formed from or define individual panels 1220a,b and can be used to cover the base 1000.

The cover 1210 is shown loose above the base 1000 but upon fastening of the cover 1210 through assembly of the suspender 700, especially with other instances of the clip 100 (in other holes not shown but spaced apart from the hole 1080 shown), the cover 1210 can, as desired, be made as taut or as tight against the upper surface 1012 and any other surface of the base 1000. In a final assembled condition of the assembly 1200, the base 1000 can be positioned at least in part between the cover 1210 and the barbs 250,350 of the clip 100. More specifically, the clip centerline axis 101 can be aligned with the central axis 1001 and the legs 200,300 of the clip 100 can press against an interior surface of the body 1010 such as the surface 1088 at the intermediate portion 1082 of the hole 1080. As shown, the barbs 250,350 can prevent upward movement of the clip 100 even under the load effected by taut cover 1210. The presence of the suspender 700—and its extension in the X-axis direction on either side of the hole 1080 and, more specifically, the intermediate portion 1082—can prevent an opposite downward movement of the clip 100 through the hole 1080 and past a step surface 1083 defined by the hole 1080.

FIG. 13 is an end view of the clip 100 and the base 1000 after installation of the clip 100 into the base 1000 in accordance with another aspect of the current disclosure—and with the suspender 700 and cover 1210 removed for clarity. Each of an upper body 1010a and a lower body 1010b can define respective lower surfaces 1011a,b and upper surfaces 1012a,b. The lower surface 1011a of the upper body 1010a can contact the upper surface 1012b of the lower body 1010b. As shown, an upper body 1010a can define the hole 1080 including at least a portion of the intermediate portion 1082 and also the upper portion 1084; and the lower body 1010b can also define the hole 1080 including at least another portion of the intermediate portion 1082 and also the lower portion 1086. In some aspects, as shown, the material of the lower body 1010b can be the same as the material of the upper body 1010a. In other aspects, the materials of the upper body 1010a and the lower body 1010b can be different. As shown, the lower portion 1086 of the hole 1080 can form a pocket 1380 instead of a through hole passing entirely through the body 1010b of the base 1000. An undercut portion of the pocket 1380 can define the surface 1088 which, again, the barbs 250,350 can contact and be restrained by.

FIG. 14 is an end view of the clip 100 and the base 1000 after installation of the clip 100 into the base 1000 in accordance with yet another aspect of the current disclosure. As shown, the lower body 1010b can define at least a portion of the hole 1080 such as intermediate portions 1082a,b for installation of the clip 100, and the barbs 250,350 of the clip 100 can contact and be restrained by the lower surface 1011b of the lower body 1010b. As shown, the upper body 1010a can be formed from a deformable material, and the lower body 1010b can be formed from a hard or rigid material such as, for example and without limitation, molded, extruded, stamped, and/or machined material comprising, for example and without limitation, metal, plastic, or a composite material. As shown, the lower body 1010b can function as a backing plate, which can provide benefits such as, for example and without limitation, providing greater rigidity to the base 1000 or making it more difficult for the clip 100 to ever be pulled through the hole 1080. In some aspects, both of the bodies 1010a,1010b can be formed from deformable materials, or both of the bodies 1010a,1010b can be formed from a hard or rigid material.

Figure 15:
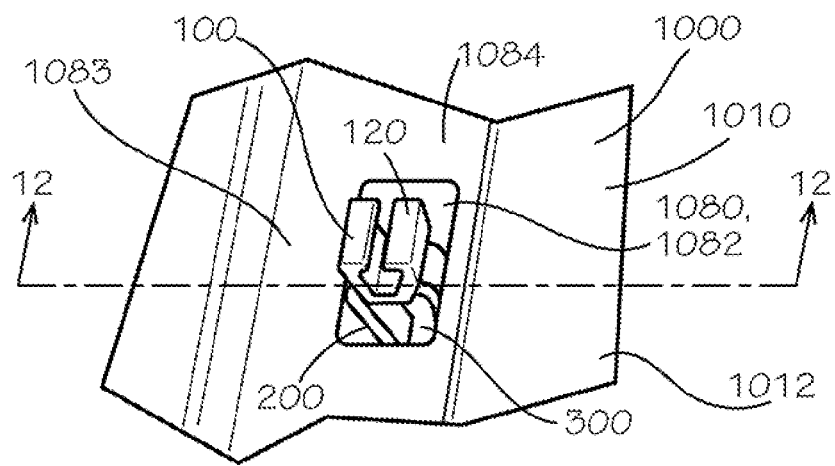
FIG. 15 is a top perspective view of the clip and the base of FIG. 10 after installation of the clip into the base.

FIG. 15 is a top perspective view of the clip 100 and the base 1000 of FIG. 10 after installation of the clip 100 into the base 1000 and showing the chuck 120 extending above the step surface 1083.

Figure 16:
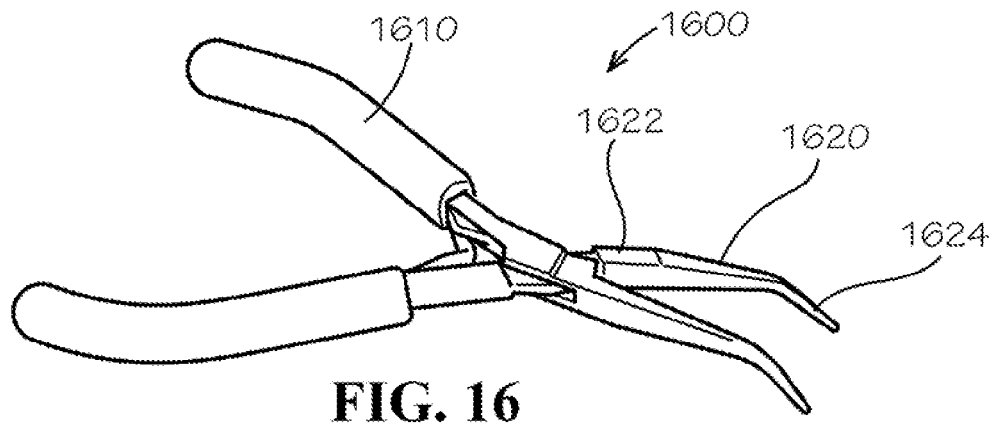
FIG. 16 is a top perspective view of a pair of bent-nose pliers for use in removing any of the clips disclosed herein including the clip of FIG. 10.

FIG. 16 is a top perspective view of a pair of pliers 1600, which can be bent-nose pliers as shown. The bent-nose pliers 1600 can comprise handles 1610 and jaws 1620. A tip portion 1624 of each of the jaws 1620 can be angled with respect to a base portion 1622 of the respective jaws 1620 to make it easier for the pliers 1600 to be placed against the lower surface 1011 of the base 1000 and under the barbs 250,350 of the clip 100 without the hand of an operator of the pliers 1600 contacting the lower surface 1011.

Figure 17:
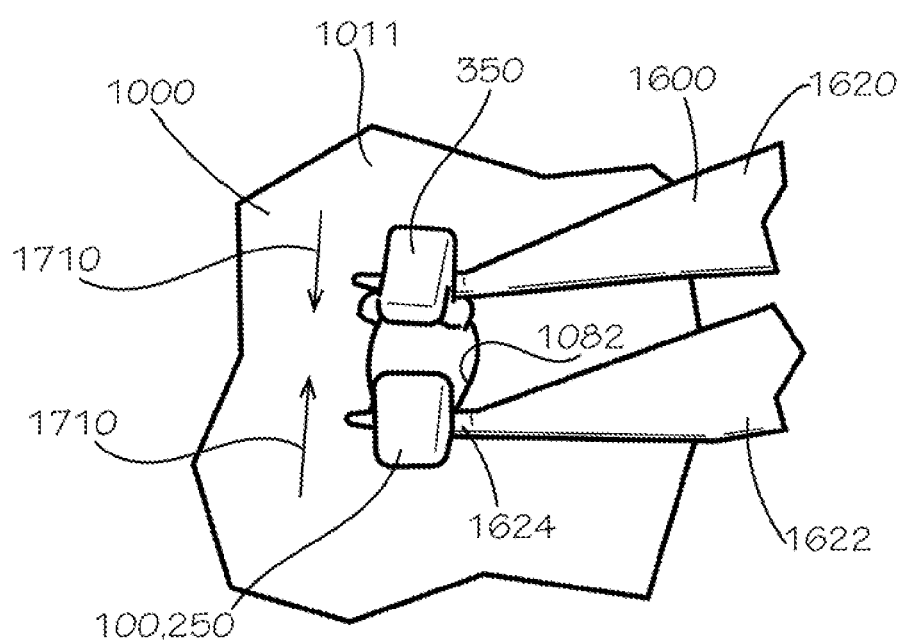
FIG. 17 is a bottom perspective view of an assembly of the base and the cover with the bent-nose pliers shown in the process of removing the clip of FIG. 10 from the base of FIG. 10.

FIG. 17 is a bottom perspective view of the assembly 1200 with the bent-nose pliers 1600 shown in the process of removing the clip 100 from the base 1000. As shown, the tip portion 1624 of each of the jaws 1620 of the pliers 1600 can be positioned between the respective barbs 250,350 and brought together in an inward movement 1710 of either or both of the barbs 250,350 by squeezing the handles 1610 until the barbs 250,350 are brought close enough together to be able to pass through the hole 1080 and in particular the portion 1082.

FIGS. 18-21, 29, and 30 show the clip 100 in accordance with another aspect of the current disclosure. As shown in the end view of the clip 100 shown in FIG. 18, the clip 100 can comprise the aforementioned chuck 120, the first leg 200, and the second leg 300. Again, as shown, each of the first portion 210 of the first leg 200 and the first portion 310 of the second leg 300 can be straight or can comprise a straight portion defining the respective centerlines 216,316. The centerlines 216,316 can be angled with respect to a bottom surface of the chuck 120 by leg angles 218,318, and each of the leg angles 218,318 can be obtuse angles, i.e., angles measuring more than 90 degrees. Moreover, the leg angle 318 can be greater than the leg angle 218. As described above, the leg angles 228,328 can be acute angles; and the leg angle 328 can be greater than the leg angle 228.

In various aspects, the clip 100 can define a vertical offset 1810 between the distal end 204 of the first leg 200 and the distal end 304 of the second leg 300 such that the second leg 300 is shorter than the first leg 200. In various aspects, a length of either or both of the legs 200,300 as measured from its attachment point on the chuck 120 can be increased or decreased to increase or decrease the amount of flex of the legs 200,300 or to facilitate use of the clip 100 in a thicker base 1000 (shown in FIG. 10) or at least in a base 1000 in which the intermediate portion 1082 (shown in FIG. 10) of the hole 1080 (shown in FIG. 10) is taller (or thicker) or shorter (or thinner). Generally speaking, variables affecting the flexibility of each of the legs 200,300 can include the length, the leg thickness 209,309, and the primary width 207,307 of the legs 200,300. Again, in some aspects, the barb 250 can define the maximum thickness 239 being greater than the leg thickness 209, and the barb 350 can define the maximum thickness 339 being greater than the leg thickness 309. When viewed from at least one direction such as the front, i.e., along at least the X-axis direction, the barb 250 can define a constant thickness from the base 252 where it extends from the second portion 220 of the first leg 200 to the tip 254, and the barb 350 can define a constant thickness from the base 352 where it extends from the second portion 320 of the second leg 300 to the tip 354. As shown, each of the end surfaces 255,355 can be flat. As shown, each of the end surfaces 255,355 can be approximately vertical or aligned with or oriented along the Z-axis direction when the clip is in the unflexed position. In any case, as described above, the barb 250 of the first leg 200 can be used to temporarily engage and hold down the clip 100 to the base 1000.

Figure 18:
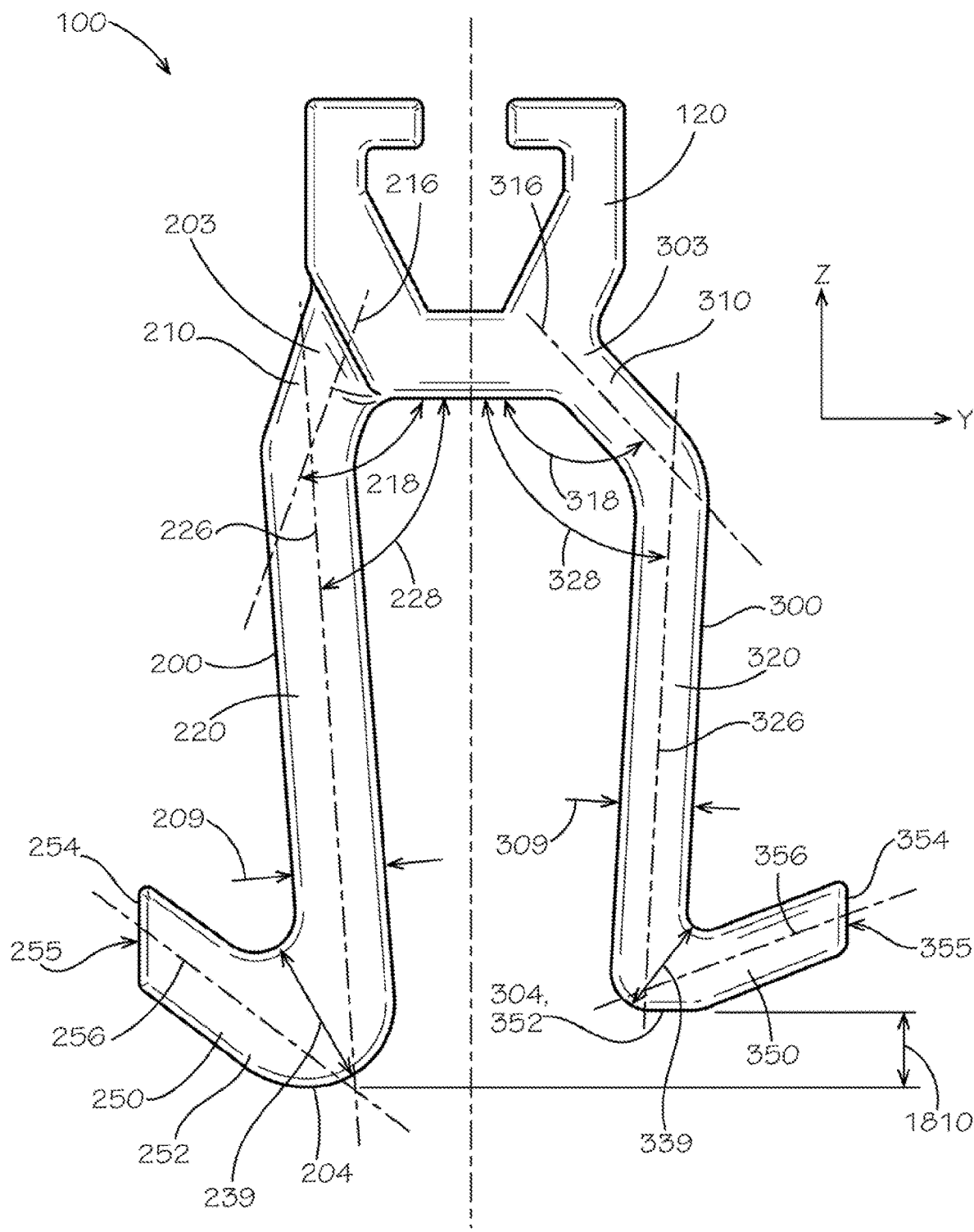
FIG. 18 is an end view of a clip in accordance with another aspect of the current disclosure.
Figure 19:
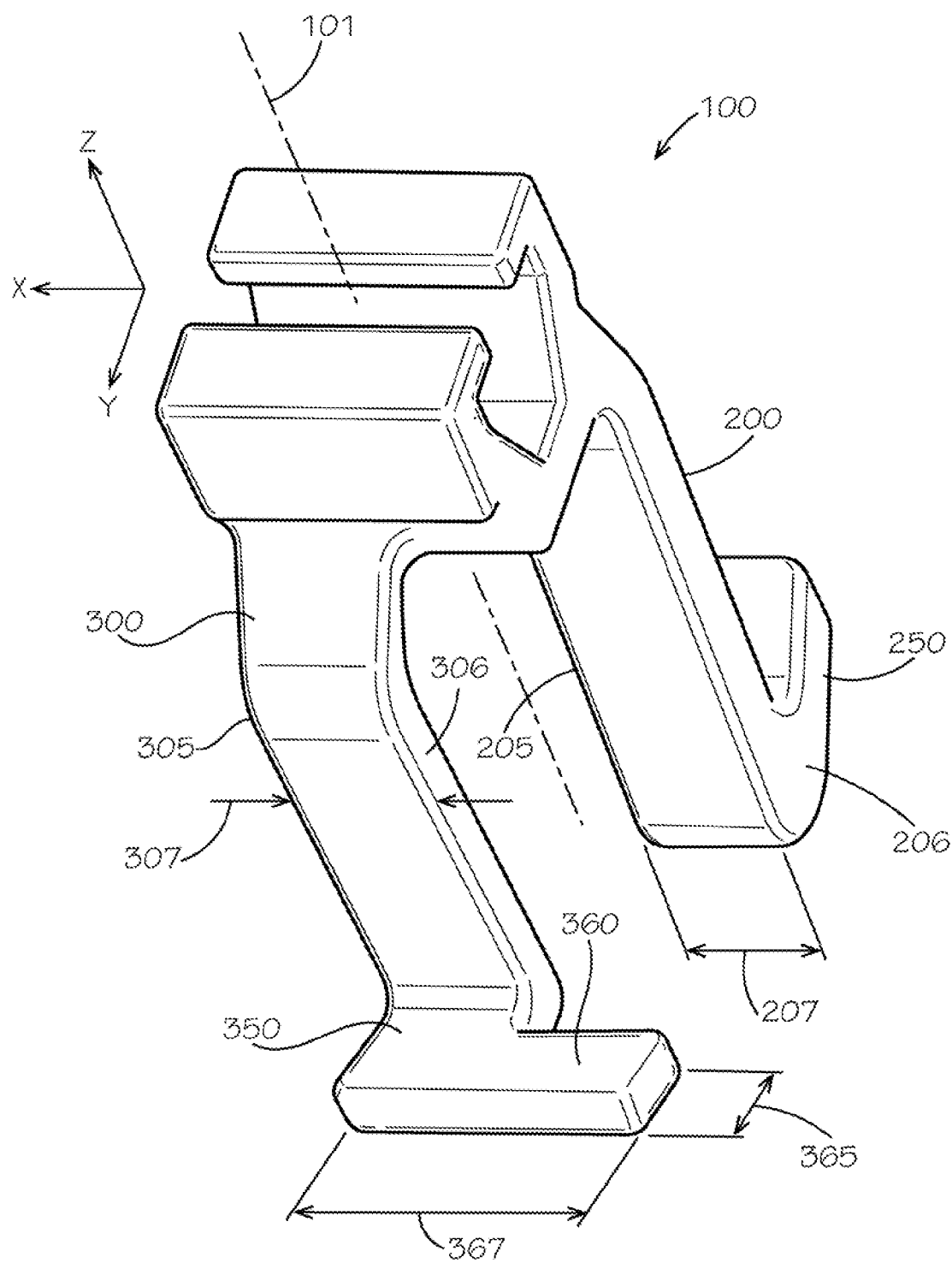
FIG. 19 is a top perspective view of the clip of FIG. 18.

FIG. 19 is a top perspective view of the clip 100 of FIG. 18. In some aspects, the primary width 207 of the first leg 200 can be greater than the primary width 307 of the second leg 300. In other aspects, the primary width 207 of the first leg 200 can be equal to the primary width 307 of the second leg 300. As shown, the first leg 200 and the second leg 300 can be offset from each other in the X-axis direction. Put differently, the legs 200,300 can be located in different planes offset from each other in the X-axis direction. More specifically, the second end 306 of the second leg 300 and the first end 205 of the first leg 200 can be aligned or can be offset in the X-axis direction to prevent interference between the first leg 200 and the second leg 300 during bending.

As shown, the second leg 300 can comprise a stopper 360, which can extend from the second leg 300 in the X-axis direction towards the first leg 200 and can be sized and configured to limit maximum bending of the second leg 300. By limiting maximum bending of the second leg 300, breakage of the second leg 300 resulting from overbending of the second leg 300 can be avoided. A width 365 and a position of the stopper 360 in approximately the Y-axis direction can be adjusted to allow more or less maximum bending of the second leg 300. A width 367 of the stopper 360 in the X-axis direction can also be adjusted but in any case the stopper 360 can overlap with the first leg 200 in the X-axis direction such that the stopper 360 contacts the first leg 200 to limit the maximum bending of the second leg 300. As shown, the barb 350 can at least in part define the stopper 360.

Figure 20:
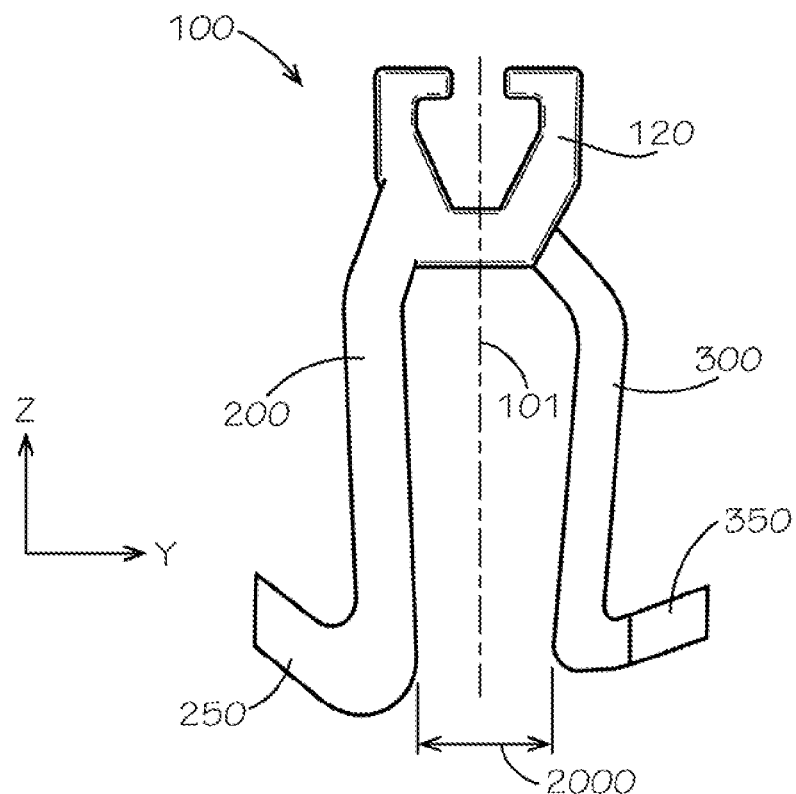
FIG. 20 is an end view of the clip of FIG. 18 in an unflexed position.
Figure 21:
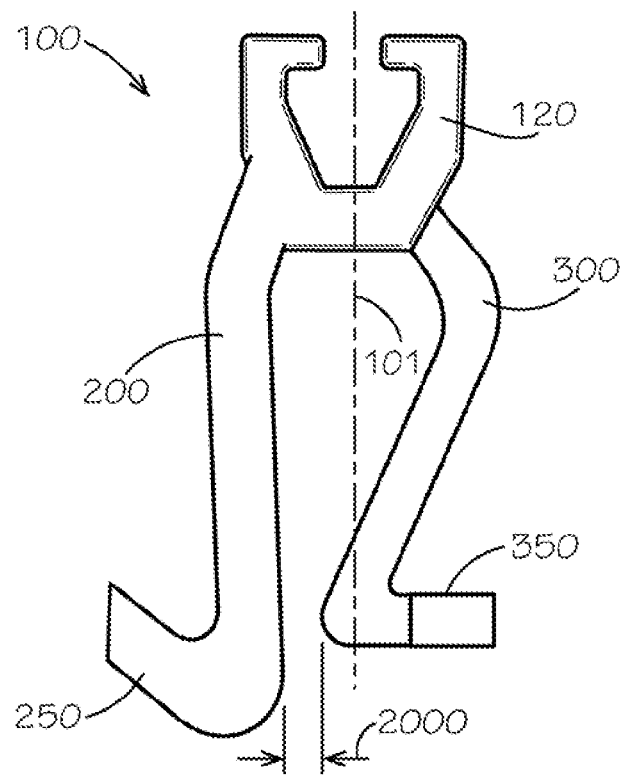
FIG. 21 is an end view of the clip of FIG. 18 in a flexed position.
Figure 24:
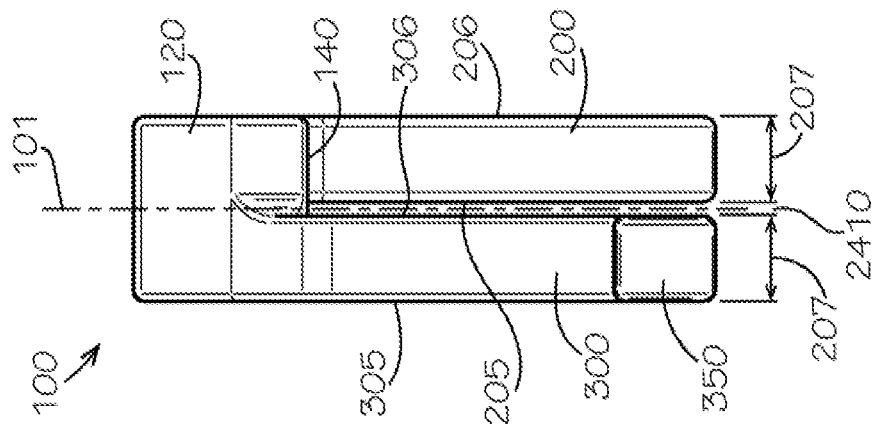
FIG. 24 is a side view of the clip of FIG. 22.

FIG. 20 shows the clip 100 in the unflexed or unbent condition, and FIG. 21 shows the clip 100 in the flexed or bent condition. When a force applied to the clip causes the clip 100 to change from the unbent position to the bent position, a distance 2000 between inside surfaces of the legs 200,300 can decrease, which can allow the clip 100 to pass through the hole 1080 or a portion thereof in the base 1000. While the first leg 200 can be allowed to bend during installation of the clip 100, the second leg 300 can be allowed to bend further due to, for example, the leg thickness 309 (shown in FIG. 18) of the second leg 300 being thinner than the leg thickness 209 (shown in FIG. 18) of the first leg 200, the primary width 307 (shown in FIG. 19) of the second leg 300 being narrower than the primary width 207 (shown in FIG. 19) of the first leg 200, and the differing leg angles 218,318,228,328.

FIGS. 22-28 show the clip 100 in accordance with yet another aspect of the current disclosure. As shown in the end view of the clip 100 shown in FIG. 22, the clip 100 or at least the shape of the legs 200,300 when viewed from the front along the X-axis direction can be symmetric about the centerline axis 101. For example and without limitation, the leg angles 228,328 can be the same, the leg thicknesses 209,309 can be the same, the barbs 250,350 can be the same, any other features of the legs 200,300 can be the same, and the legs 200,300 can otherwise have the same shape and resulting flexibility. Each of a lower surface 253 of the first barb 250 and a lower surface 353 of the second barb 350 can be rounded to facilitate insertion of the clip 100 in the hole 1080 (shown in FIG. 27). Either of the barbs 250,350 or, as shown, both of the barbs 250,350 can be tapered.

Figure 23:
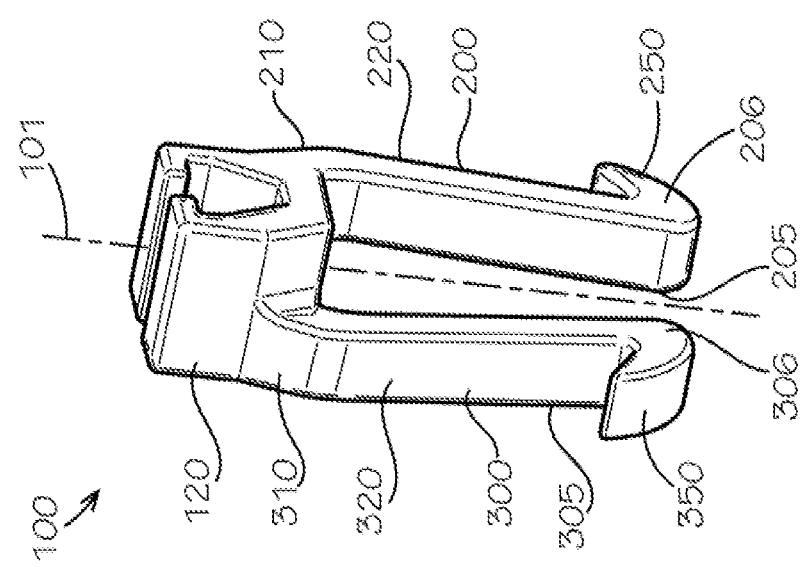
FIG. 23 is a side perspective view of the clip of FIG. 22.

FIG. 23 is a side perspective view of the clip 100. As shown, the legs 200,300 can be in different planes. As shown in the side view of FIG. 24, the second end 306 of the second leg 300 and the first end 205 of the first leg 200 can be offset by a gap distance 2410 to avoid interference between the legs 200,300 during bending of the legs 200,300 of the clip 100. As shown, the primary widths 207,307 can also be the same for the respective legs 200,300.

Figure 25:
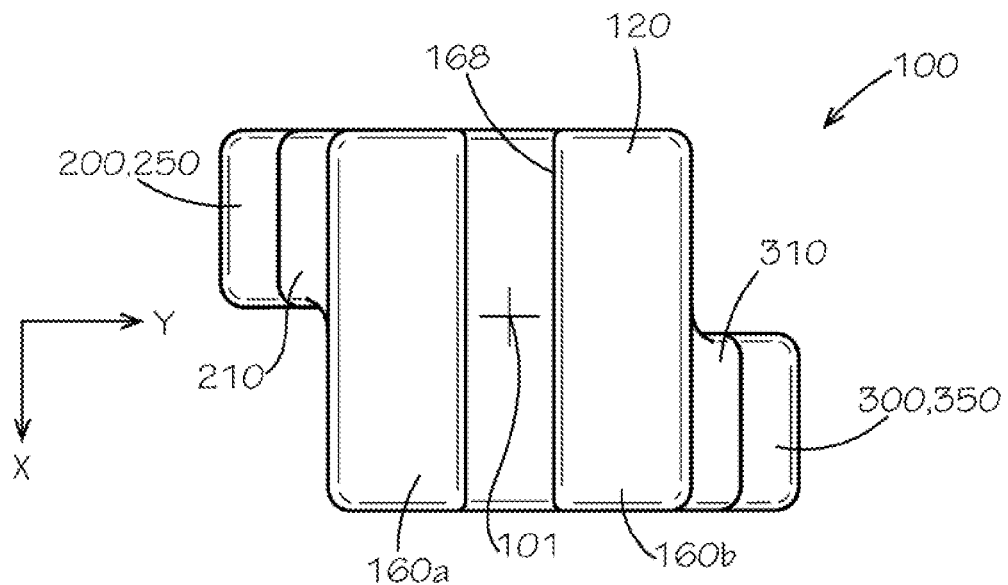
FIG. 25 is a top plan view of the clip of FIG. 22.
Figure 26:
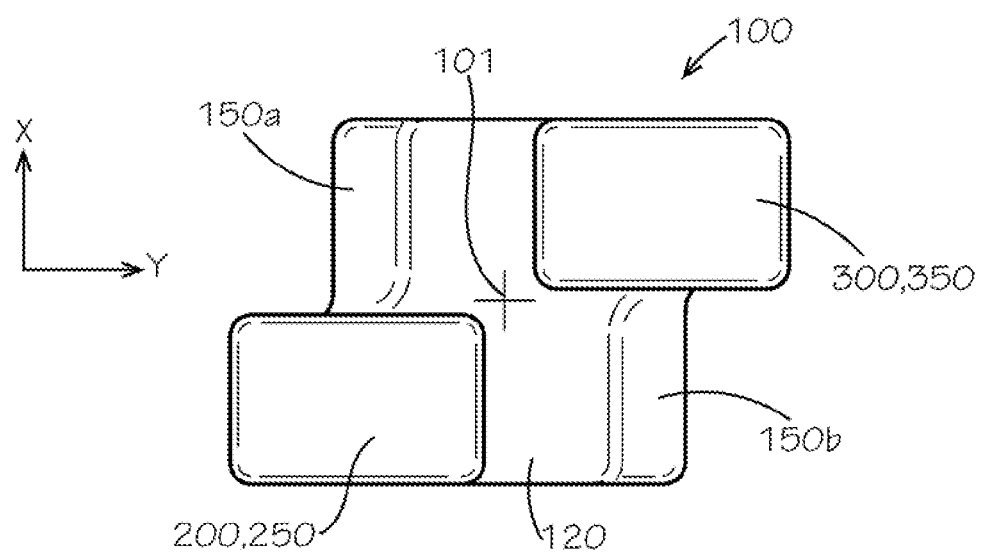
FIG. 26 is a bottom plan view of the clip of FIG. 22.

FIG. 25 is a top plan view of the clip 100, and FIG. 26 is a bottom plan view of the clip 100. In some aspects, as shown, the clip 100 can define a rotational symmetry such that the first leg 200, when rotated about the centerline axis 101, matches the shape, position, and orientation of the second leg 300.

Figure 27:
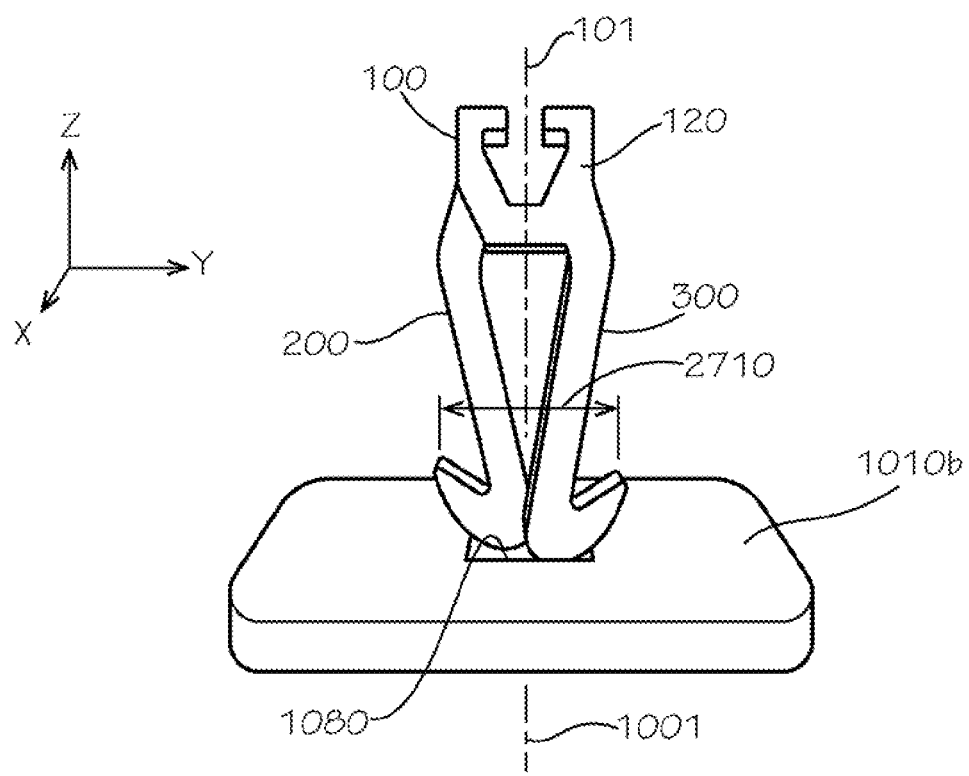
FIG. 27 is an end perspective view of the clip of FIG. 22 before installation into a hole.
Figure 28:
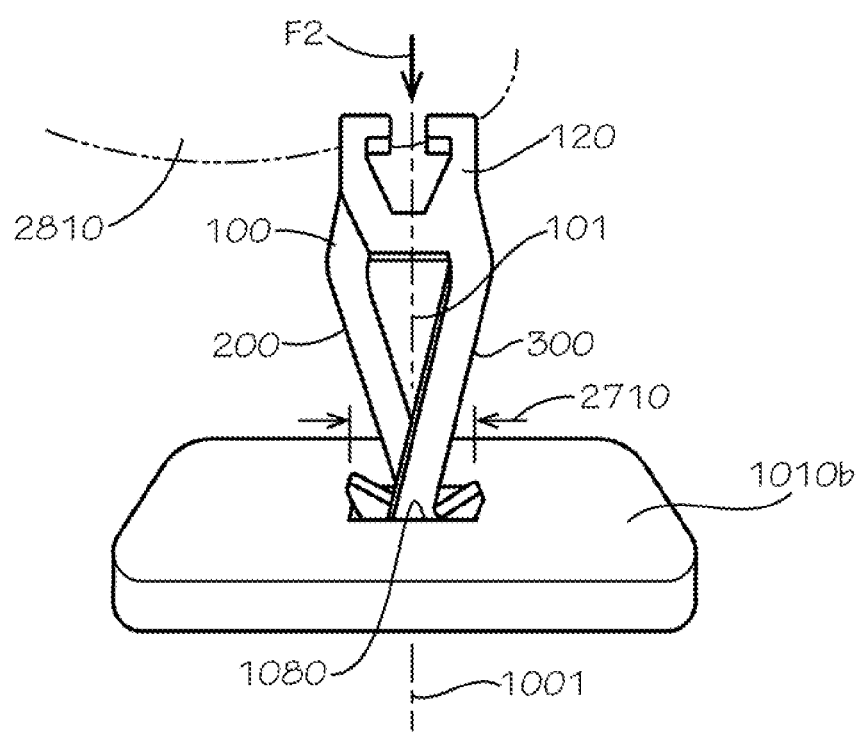
FIG. 28 is an end perspective view of the clip of FIG. 22 during installation into the hole.
Figure 29:
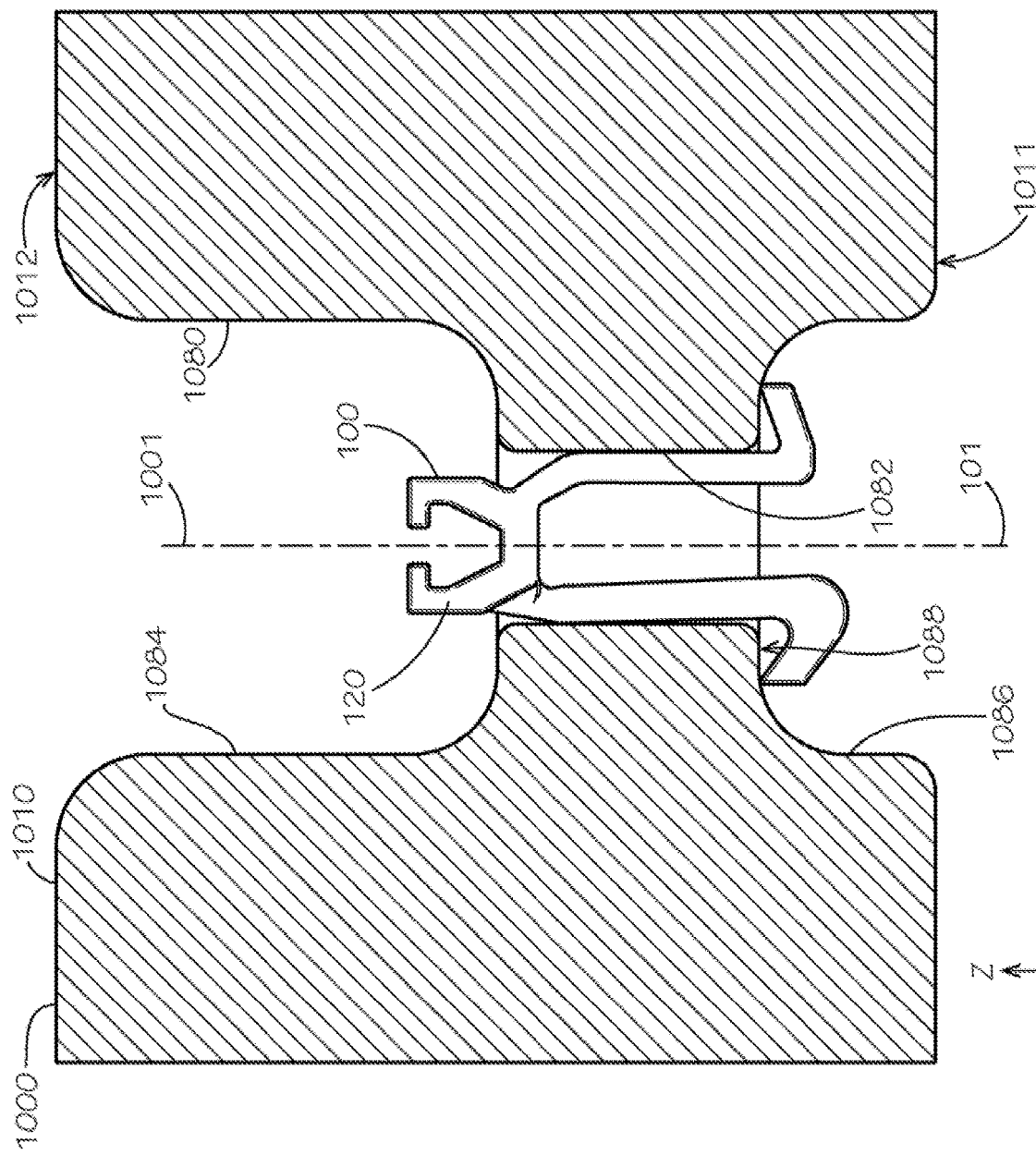
FIG. 29 is a partial sectional end view of the clip of FIG. 18 after installation into the hole.

FIG. 27 is an end perspective view of the clip 100 before installation into the hole 1080. As shown, an overall width 2710 of the clip 100 as measured at the legs 200,300 can be decreased by pushing the clip 100 into the hole 1080, which is defined here in the body 1010*b*. Instead of rotating the clip 100 during assembly as described above in some aspects of the design of the clip 100 and the base 1000 (shown in FIG. 10), the centerline axis of the clip 100 can be aligned with the central axis 1001 of the base 1000 (shown in FIG. 30) and, more specifically as shown, the body 1010*b* throughout the assembly process. As shown in the end perspective view of FIG. 28, a force F2 pushing down on the top of the clip 100 by, for example and without limitation, a finger 2810 of the assembly operator can push the clip 100 through the hole 1080. The body 1010*a* (shown in FIG. 30) of the base 1000, the cover 1210 (shown in FIG. 12), and other components are removed for clarity.

Figure 30:
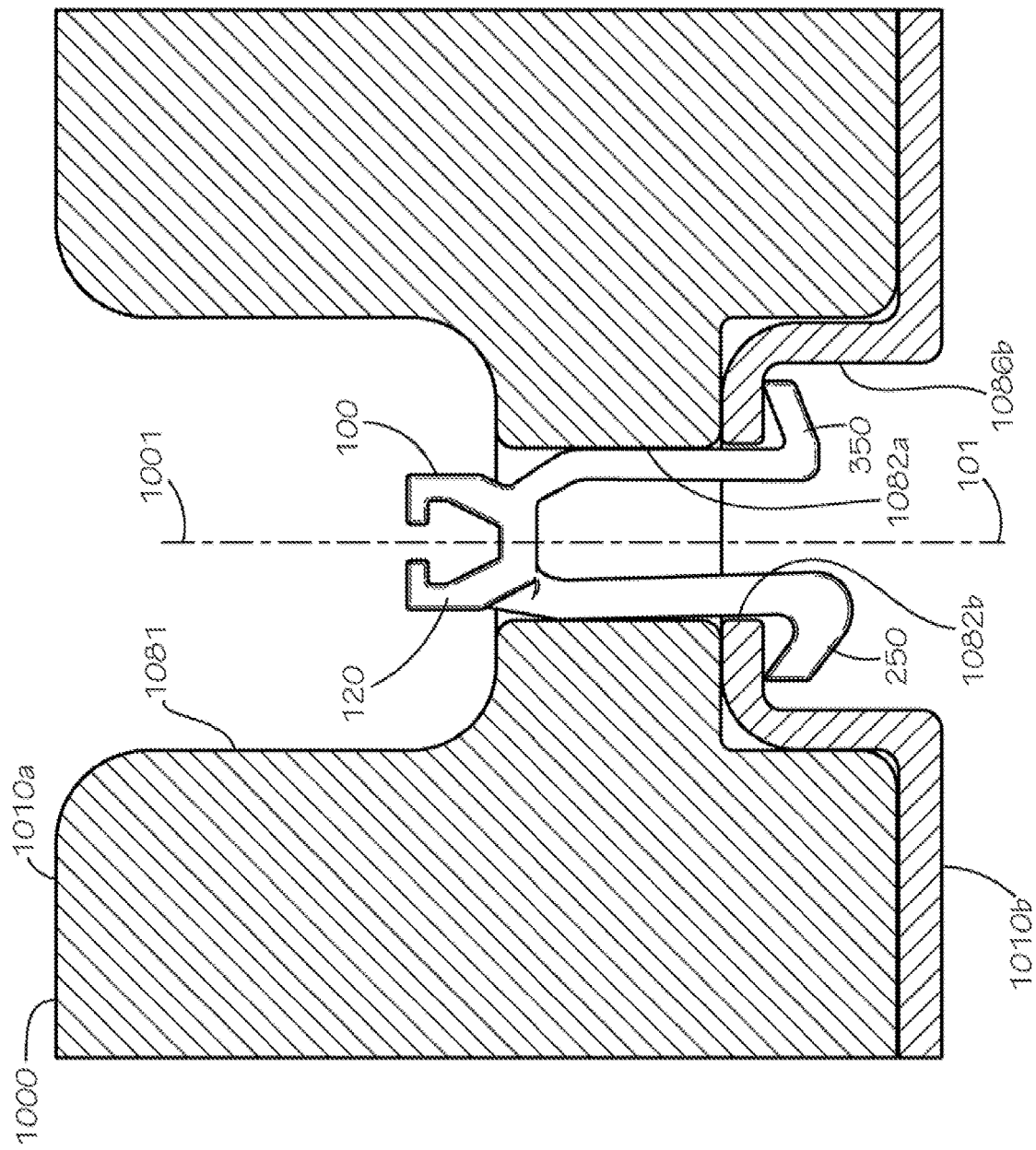
FIG. 30 is a partial sectional end view of the clip of FIG. 18 after installation into the hole in accordance with another aspect of the current disclosure.

After insertion of the clip 100 similarly as shown in FIGS. 10-12, FIG. 29 shows the clip 100 shown in FIGS. 18-21 in a final assembled position inside the base 1000. In some aspects, as shown, walls or sides of the intermediate portion 1082 of the hole 1080 can be vertical or can be aligned with the central axis 1001. As shown in FIG. 30, the base 1000 can comprise not only the body 1010*a* but also the body 1010*b*, which can be made from a more rigid material and can be molded to define a hole 1086*b* providing clearance for the barbs 250,350.

While not explicitly shown, the assembly 1200 (shown in FIG. 12) can comprise any of multiple aspects of the clip 100 in position against the lower surface 1011 (shown in FIG. 12) of the base 1000 (shown in FIG. 12). In various aspects, any number of the clips 100 can be installed through the base 1000 to secure the cover 1210 (shown in FIG. 12). In some aspects, a certain number of clips 100 can be specified. In other aspects, a spacing between adjacent clips 100 in the X-axis direction and in the Y-axis direction can be specified. A greater number of the clips 100 and a smaller spacing between the adjacent clips 100 can in some aspects generally result in an improved appearance. In some aspects, for example and without limitation, a spacing between the clips 100 can be set at approximately 5 millimeters minimum or at least the overall width of the clip 100 in the X-axis direction. In some aspects, the spacing between the clips can be approximately 100 millimeters. In some aspects, any spacing that is physically possible can be used.

The clip 100 can be made of any one of a number of deformable materials able to elastically deform to the degree described including, for example and without limitation, engineered polymers. The clip 100 can be formed by an injection molding process but could conceivably be made from other processes such as, for example and without limitation, by an extruding process and/or a machining process. The base 1000 itself can be made from any desirable material using a variety of processes, which in itself can be a significant benefit of the clip 100 not depending on the material of the base 1000 but instead providing its own anchoring function.

Figure 31:
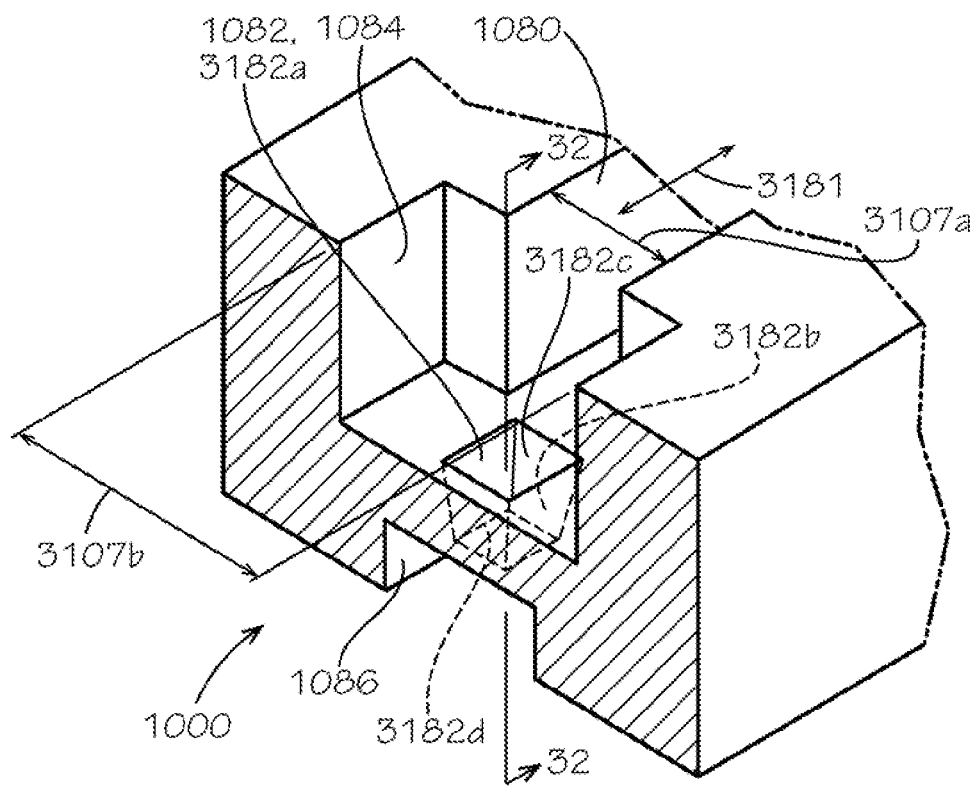
FIG. 31 is a detail perspective view of a portion of a base in accordance with another aspect of the current disclosure.

FIG. 31 is a detail perspective view of a portion of the base 1000 in accordance with another aspect of the current disclosure. As shown, the upper portion 1084 of the hole 1080 can widen at or proximate to an installation position of the clip 100 (shown in FIG. 32) through the intermediate portion 1082. For example, the hole 1080, which can comprise or define a trench as shown, can define a width 3107*a* generally and can define a width 3107*b* proximate to the intermediate portion 1082. As shown, the width 3107*b* can be greater than the width 3107*a*. In some aspects, also as shown, the intermediate portion 1082 can define one or more sloping sides, which can result in a bottom end of the intermediate portion 1082 being smaller in at least one dimension than a top end of the intermediate portion 1082. More specifically, sides of the intermediate portion 1082 of the hole 1080 such as transverse sides 3182*a,b* and longitudinal sides 3182*c,d* can be sloping. The transverse sides 3182*a,b* can be facing in a direction that is angled with respect to a longitudinal direction 3181 of the trench, which can be the X-axis direction, and the longitudinal sides 3182*c,d* can be aligned with the longitudinal direction 3181.

Figure 32:
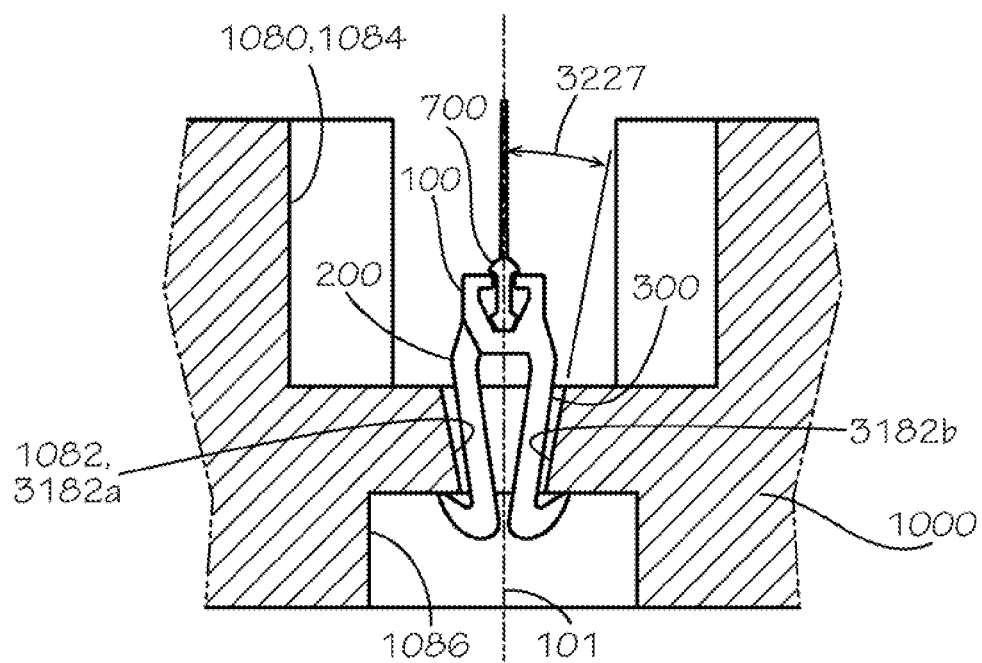
FIG. 32 is a sectional end view of the clip of FIG. 22 after installation into the base of FIG. 31.

FIG. 32 is a sectional end view of the clip 100 after installation into the base 1000 of FIG. 31. As shown, the clip 100 and the base 1000 can define a space or gap therebetween, and a wall of the intermediate portion 1082 of the hole 1080 such as the transverse sides 3182*a,b* can be angled with respect to the centerline axis 101 by a slope angle 3227, which can be greater than or equal to the leg angles 227,327 (shown in FIG. 2). In some aspects, includes these aspects, any or each of the transverse sides 3182*a,b* or the longitudinal sides 3182*c,d* (shown in FIG. 31) can be sloped with respect to the central axis 1001. In some aspects, sloped sides of the intermediate portion 1082 can improve manufacturability of the base 1000 and ease of assembly of the clips 100 with the base 1000.

Figure 33:
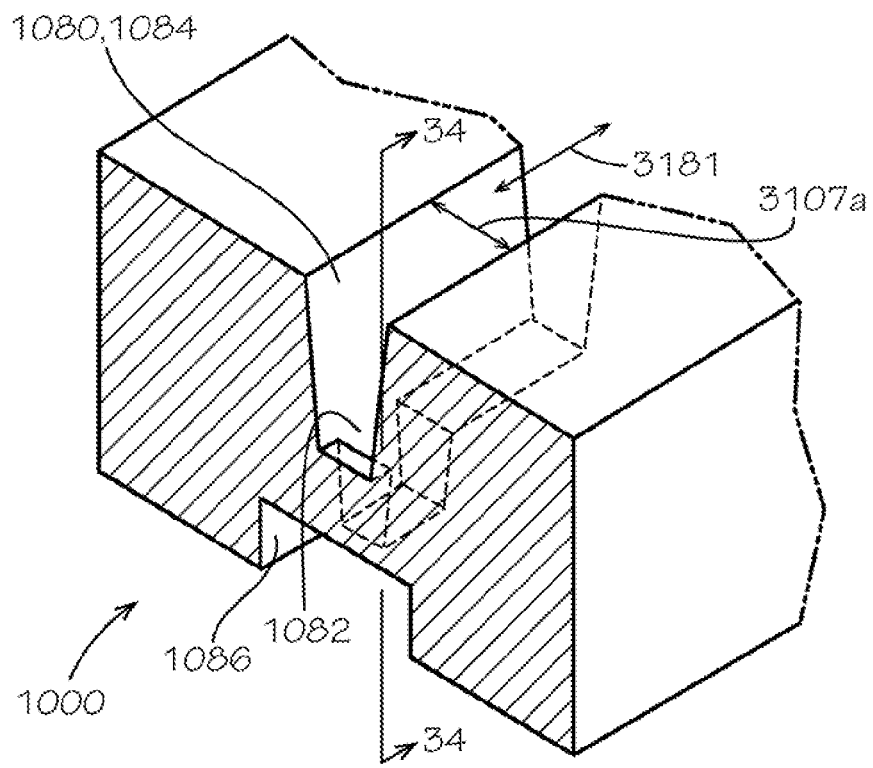
FIG. 33 is a detail perspective view of a portion of a base in accordance with yet another aspect of the current disclosure.

FIG. 33 is a detail perspective view of a portion of the base 1000 in accordance with yet another aspect of the current disclosure. As shown, the upper portion 1084 of the hole 1080 can remain constant at the width 3107*a* even proximate to and at the intermediate portion 1082.

Figure 34:
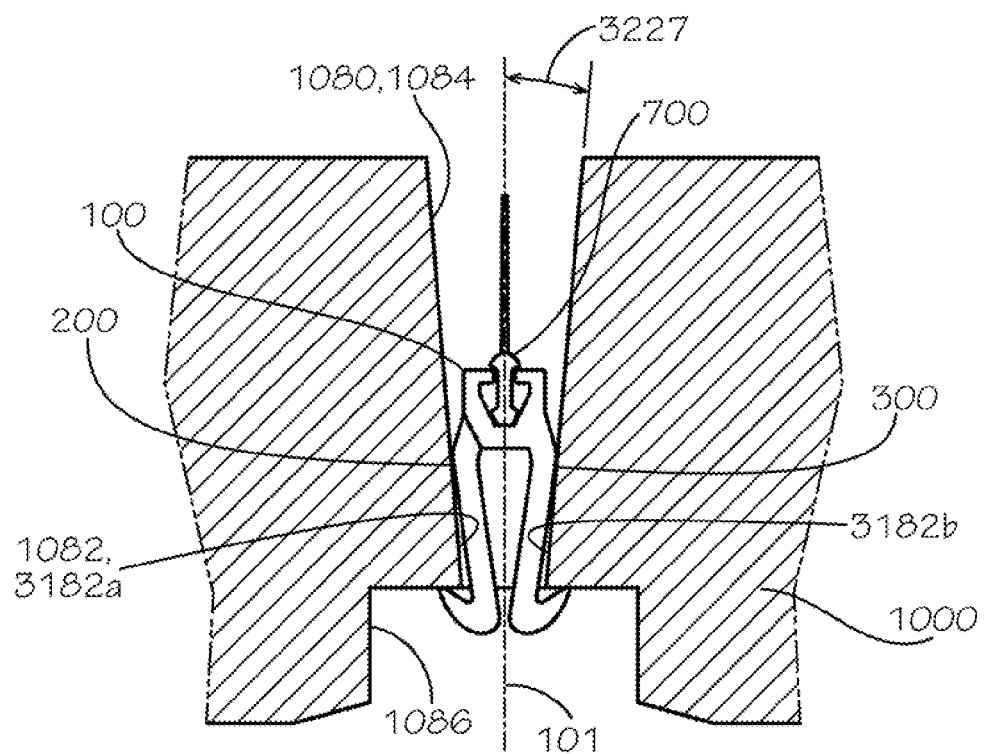
FIG. 34 is a sectional end view of the clip of FIG. 22 after installation into the base of FIG. 33.

FIG. 34 is a sectional end view of the clip 100 after installation into the base 1000 of FIG. 33. As shown, the upper portion 1084 of the hole 1080 can itself define one or more sloping sides, which can result in a bottom end of the upper portion 1084 being smaller in at least one dimension than a top end of the intermediate portion 1084. Additionally, sides of the upper portion can be sloped at the same slope angle 3227 as the intermediate portion 1082 of the hole 1080 are at a different angle. As shown, the slope angle 3227 can be less than the leg angles 227,327 (shown in FIG. 2).

Figure 35:
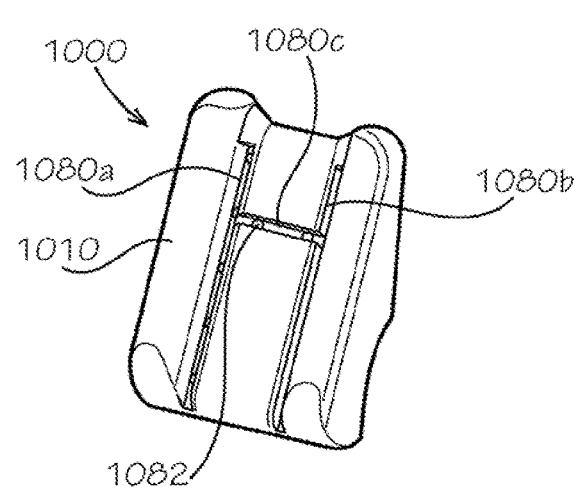
FIG. 35 is a front perspective view of a portion of a base exemplarily structured as a seat back cushion in accordance with yet another aspect of the current disclosure.

FIG. 35 is a front perspective view of a portion of the base 1000, which is exemplarily structured as a seat back cushion of a vehicle in accordance with yet another aspect of the current disclosure. As shown, the body 1010 of the base 1000 can define a plurality of holes 1080, each set of which can define a corresponding trench to hold the suspender 700 and a plurality of intermediate portions 1082 to receive the clips 100. The holes 1080 can be oriented as desired in the base, including at intersections of surfaces or elsewhere where it may be beneficial to hold the cover 1210 (shown in FIG. 12) snug or tight to the base 1000.

Figure 36:
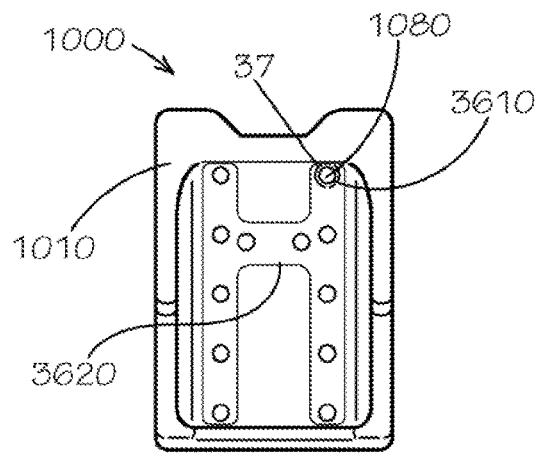
FIG. 36 is a rear view of a portion of the base of FIG. 35 comprising and shown facing a plurality of reinforcement rings.

FIG. 36 is a rear view of a portion of the base 1000 of FIG. 35 comprising and shown facing a plurality of reinforcement rings 3610, each of which can be the aforementioned body 1010*b* of the base 1000 (as shown, for example and without limitation, in FIG. 14 or FIG. 30). Each of the reinforcement rings 3610 can be a flanged bushing, a band, an annular body, a washer, a plate, a grommet, or another shape able to receive the clips 100. The reinforcement rings 3610 can be formed from a solid material or can be formed into a solid material such as, for example and without limitation, through an injection molding process, in which case a variety of shapes can be used for the reinforcement rings 3610. In some aspects, whether stamped or molded, the reinforcement ring 3610 can comprise a wire or other cross-member extending across the reinforcement ring 3610 to help secure or prevent rotation of the clip 100. In some aspects, the reinforcement ring 3610 can define a recessed portion in an axial outer surface of the reinforcement ring 3610, in which case the barbs 250,350 can be received within the recessed portion.

As shown, a panel 3620 can be positioned between the reinforcement rings 3610 and the body 1010, which itself can be formed into any desirable shape. The panel 3620, which can be an installation panel or backup panel, can comprise or be formed from any nonwoven, woven, or knitted scrim fabric. As shown, a single panel 3620 can extend under and between a plurality of or, as desired, even all of the reinforcement rings 3610. At the same time, use of the panel 3620 can be minimized by limiting a size of the panel 3620. For example, the panel 3620 can extend only a limited distance from an edge or a center of each reinforcement ring 3610 and, as desired, between adjacent reinforcement rings 3610. In some aspects, the panel 3620 can result in a reduction or elimination of noises—such as squeaking noises, which in some aspects can otherwise become audible when an end user of the vehicle sits on a seat comprising the base 1000. Such noises can result, for example and without limitation, from contact between a surface of the base 1000 and a structure (not shown) supporting the base 1000 without the panel 3620 in between. In some aspects, the panel 3620 can reinforce the body 1010 of the base 1000 so that during installation of the reinforcement rings 3610 or over time during use of an assembled product such as a seat comprising the assembly 1200 (shown in FIG. 12) the reinforcement rings 3610 do not pull through or otherwise deform a surface of the body 1010.

In some aspects, the panel 3620 or the reinforcement rings 3610 or both the panel 3620 and the reinforcement rings 3610 can be assembled in place before or during forming of the base 1000. For example and without limitation, the panel 620 or the reinforcement rings 3610 can be positioned in a mold used to form the base 1000 and during the molding process can be formed as part of—and can be simultaneously assembled and even secured to—the base 1000. More specifically, the reinforcement rings 3610 can comprise a magnetic material such as, for example and without limitation, iron and can thereby be attracted to an inner surface of tooling during the molding process. In some aspects, the panel 3620 or the reinforcement rings 3610 or both the panel 3620 and the reinforcement rings 3610 can be assembled in place after forming of the base 1000. For example and without limitation, the panel 3620 can be positioned against or even secured against the body 1010 after molding thereof, although in some aspects it will be beneficial to pre-form holes 3780 (shown in FIG. 37) in the body 1010 or holes (not shown) in the panel 3620 or both the holes 3780 in the body 1010 and the holes in the panel 3620 to facilitate positioning of the panel 3620 and readily receive the reinforcement rings 3610 without further cutting or forming of the base 1000. The reinforcement rings 3610 can be assembled to the base 1000 in one or more of a variety of ways such as, for example and without limitation, using friction or adhesive between the reinforcement rings 3610 and the base 1000 or can be molded in place on the base 1000—such as in an overmolding process.

Figure 22:
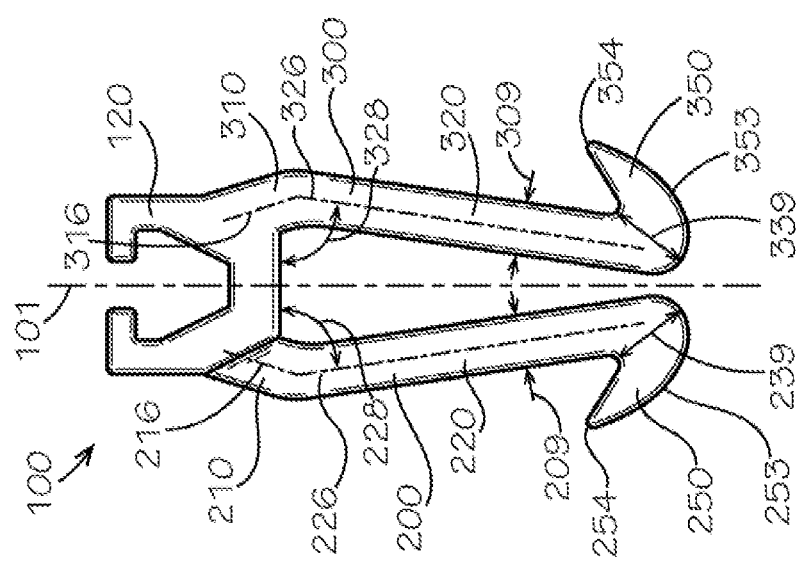
FIG. 22 is an end view of a clip in accordance with yet another aspect of the current disclosure.
Figure 37:
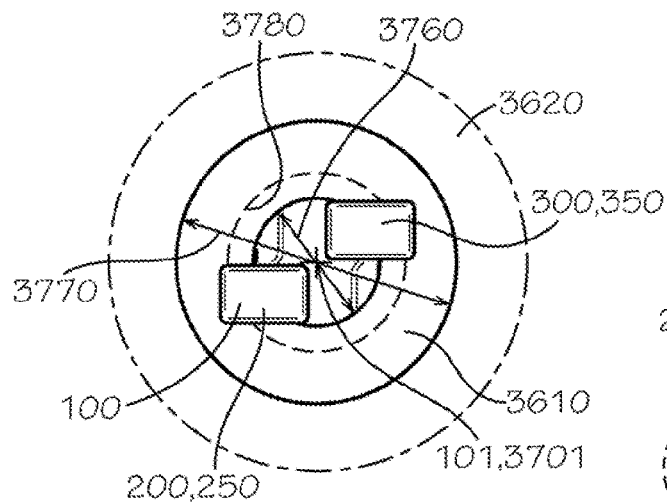
FIG. 37, taken from detail 37 of FIG. 36, is a detail view of the clip of FIG. 22 shown installed in the base of FIG. 35 through one of the plurality of reinforcement rings.

FIG. 37, taken from detail 37 of FIG. 36, is a detail view of the clip 100 of FIG. 22 shown installed in the base 1000 of FIG. 35 through one of the plurality of reinforcement rings 3610. As shown, the centerline axis 101 can be substantially aligned with an axis 3701 of the reinforcement ring 3610. An inner diameter 3760 of any or each reinforcement ring, which can define the 3610 of the plurality of reinforcement rings 3610 can be sized sufficiently large to allow passage of the respective barbs 250,350 of the legs 200,300 during installation and yet also sufficiently small to engage the same barbs 250,350 after installation. More specifically, the inner diameter 3760 can be larger than the overall width 2710 of the clip 100 at the legs 200,300 when the clips and, more specifically, the legs 200,300 are in the flexed position. At the same time, the inner diameter 3760 can be smaller than the overall width 2710 of the clip 100 at the legs 200,300 when the clips and, more specifically, the legs 200,300 are in the unflexed position or a final engaged position after installation. An outer diameter 3770 of any or each reinforcement ring 3610 of the plurality of reinforcement rings 3610 can be larger than the overall width 2710 of the clip 100 at the legs 200,300 in any position or condition including the unflexed position or a final engaged position after installation.

Figure 38:
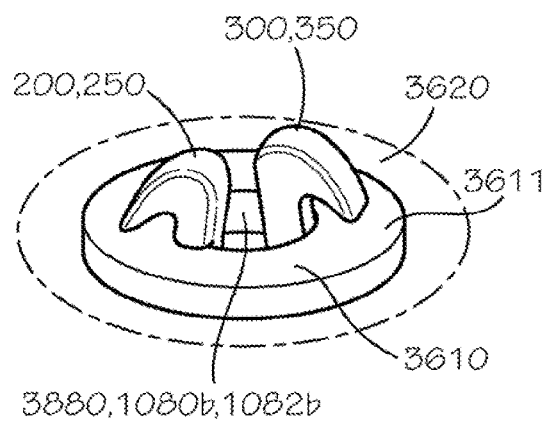
FIG. 38 is a side perspective view of the installed clip of FIG. 37 as installed through the reinforcement ring.

FIG. 38 is a side perspective view of the installed clip 100 as installed through the reinforcement ring 3610. As shown, during engagement of the respective barbs 250,350 of the legs 200,300 with the reinforcement ring 3610, respective tips 254,354 of the barbs 250,350 can contact an outer surface 3611 of the reinforcement ring 3610. As also shown, a bore 3880 of the reinforcement ring 3610 can be the hole 1080b comprising the intermediate portion 1082b. While slight interference may be visible in FIG. 38 between the legs 200,300 of the clip 100 and the reinforcement ring 3610, such interference need not be present in all or in any aspects.

In some aspects, the hole 1080, the intermediate portion 1082 thereof, a hole (not shown) defined in the panel 3620 for receipt of the reinforcement ring 3610, or the bore 3880 can be circular in shape. In other aspects, the hole 1080, the intermediate portion 1082 thereof, the hole defined in the panel 3620 for receipt of the reinforcement ring 3610, or the bore 3880 can be rectangular in shape or, more generally, can define a polygonal shape. In some aspects, the hole 1080, the intermediate portion 1082 thereof, the hole defined in the panel 3620 for receipt of the reinforcement ring 3610, or the bore 3880 can be another shape. The hole 1080, the intermediate portion 1082 thereof, the hole defined in the panel 3620 for receipt of the reinforcement ring 3610, or the bore 3880 can be cut—such as, for example and without limitation, using a die cutting process—from the respective base 1000, the panel 3620, or the reinforcement ring 3610 or can be formed integrally with and during fabrication of the respective base 1000, the panel 3620, or the reinforcement ring 3610.

Figure 39:
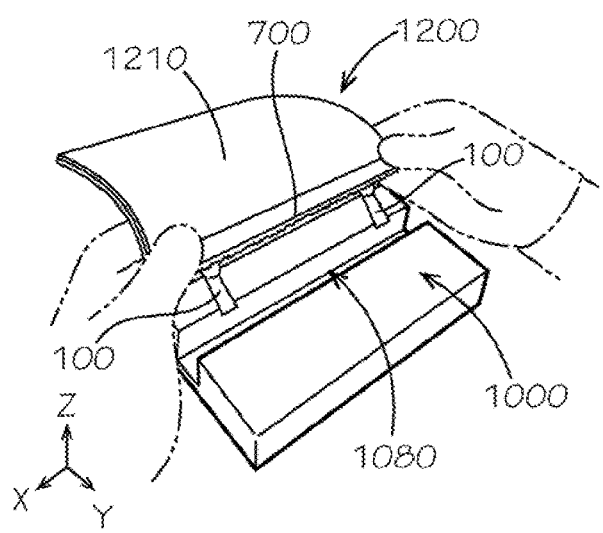
FIG. 39 is a perspective view of a base and a cover showing the cover positioned proximate to the base in accordance with yet another aspect of the current disclosure.

FIG. 39 is a perspective view of the base 1000 and the cover 1210 showing the cover 1210 positioned proximate to the base 1000 in accordance with yet another aspect of the current disclosure. As shown, the suspender 700 can be already assembled to the cover 1210, and the clips 100 can be already assembled to the suspender 700. A user or a machine manipulating the cover 1210 can, as shown, align the clips 100 in the X-axis and Y-axis directions with and adjacent to the intermediate portions 1082 and, more generally, the hole 1080, defined in the base 1000.

Figure 40:
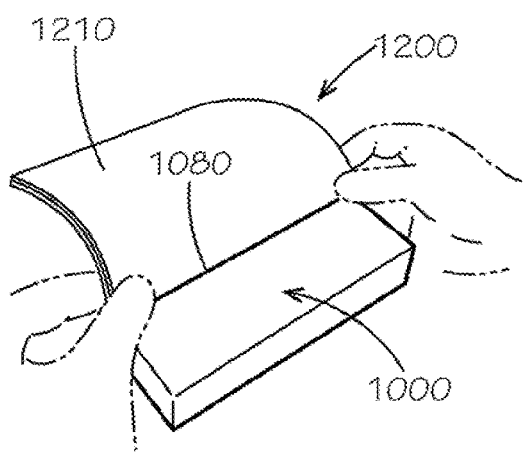
FIG. 40 is a perspective view of an assembly of the base and the cover of FIG. 39.

FIG. 40 is a perspective view of the assembly 1200 of the base 1000 and the cover 1210 of FIG. 39. As shown, the clips 100 (shown in FIG. 39), the suspender 700 (shown in FIG. 39), and a portion of the cover 1210 can be at least partially inserted into the hole 1080.

Figure 41:
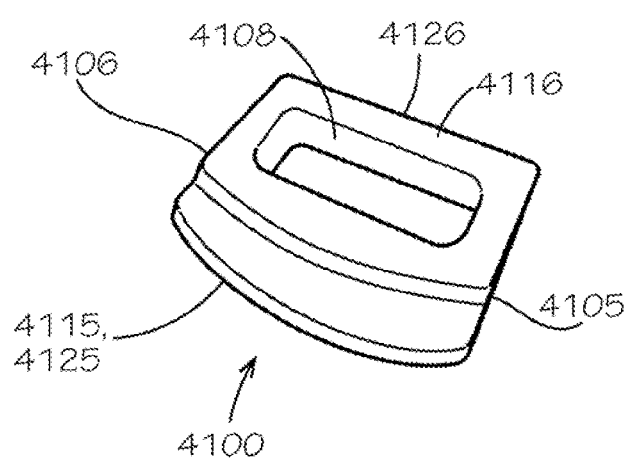
FIG. 41 is a perspective view showing an assembly tool.

FIG. 41 is a perspective view showing an assembly tool 4100, which can be used to facilitate assembly of the cover 1210 with the base 1000. The assembly tool 4100 can comprise a first end 4105 and a second end 4106. The assembly tool 4100 can further comprise a working side 4115 defining a working edge 4125 and a gripping side 4116 defining a grip edge 4126 and a handle opening 4108. For various aesthetic and functional reasons, the assembly tool 4100 can define any one of a number of different shapes. As shown, the working edge 4125 can be curved—and, as also shown, convex, and the grip edge 4126 can be straight.

Figure 42:
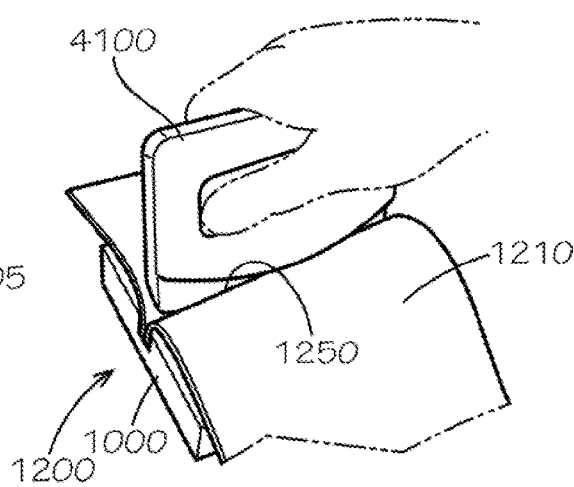
FIG. 42 is a perspective view of the assembly of FIG. 40 in which the assembly tool of FIG. 41 is being used to facilitate engagement of the clips securing the cover to the base.

FIG. 42 is a perspective view of the assembly 1200 of FIG. 40 in which the assembly tool 4100 is being used to facilitate engagement of the clips 100 and thus also the cover 1210 to the base 1000. As shown, the assembly tool 4100 can be inserted into the seam 1250 of the cover 1210 and can be pushed against the seam 1250, which can subsequently result in application of a force against the suspender 700 (shown in FIG. 39) and the clips 100 (shown in FIG. 39) tending to further engage the clips 100 with the base 1000.

A method of assembly can comprise inserting the clip 100 into the hole 1080 defined in the base 1000 and lockably engaging the clip in the hole 1080. In some aspects, the method can further comprise engaging the tool 900 with one of the first leg 200 and the second leg 300 of the clip 100 and inserting the clip 100 into the base 1000 with the tool 900 engaged with the one of the first leg 200 and the second leg 300. Inserting the clip 100 into the hole 1080 defined in the base 1000 can comprise rotating the clip 100—with or without the tool 900—with respect to the centerline axis 101 of the clip 100. The method can comprise contacting the wider portion 330 of the leg 300 and the barb 350 of the leg 300 with the tool 900, in which case rotating the tool 900 away from the centerline axis 101 can rotate both the tool 900 and the clip 100 together. In some aspects, the tool 900 can be shaped differently than shown. In some aspects, the clips 100 can be installed by hand or with a machine. Lockably engaging the clip 100 in the hole 1080 can comprise each of the first barb 250 of the first leg 200 and the second barb 350 of the second leg 300 engaging the base 1000 proximate to the first surface of the base 1000 or contacting the first surface of the base 1000. The method can further comprise pushing the seam 1250 of the cover assembly 1200 comprising the clip 100 into full engagement with the base 1000. In some aspects, engaging the clips 100 with the base 1000 can comprise pushing the clips 100, from the outer surface 1212 of the cover 1210 with an assembly tool 4100. In some aspects, engaging the clips 100 with the base 1000 can comprise pushing the clips 100, directly or indirectly through the cover 1210, by hand or with a machine.

The method can comprise assembling the clip 100 to the suspender 700 (shown in FIG. 7) before assembling the clip 100 to the base 1000. The method can comprise angling the clip 100 with respect to the central axis 1001 of the hole 1080 defined in the base 1000. The method can comprise inserting the first leg 200 into the hole 1080 of the base 1000 before inserting the second leg 300. The method can comprise inserting the second leg 300 while bringing the centerline axis 101 of the clip into alignment with the axis of the hole. The method can comprise reducing the overall width 2710 of the clip 100 at the legs 200,300 by pushing down on a top of the clip 100 in a direction angled with respect to the overall width 2710. The method can comprise removing the clip 100 with the pliers 1600.

In one exemplary aspect, a clip for securing a cover to a base can comprise a chuck defining a suspender retention cavity, the suspender retention cavity sized and configured to receive a suspender attached to the cover; a first leg extending from the chuck and comprising a first barb, the first barb extending outwardly with respect to a centerline axis of the clip; and a second leg extending from the chuck and comprising a second barb, the second barb extending outwardly with respect to the centerline axis of the clip.

In a further exemplary aspect, the clip can be symmetric about the centerline axis when viewed along at least one of X-axis, Y-axis, and Z-axis directions. In a further exemplary aspect, the clip can be rotationally symmetric about the centerline axis of the clip. In a further exemplary aspect, the first barb can extend from a distal end of the first leg and the second barb extends from a distal end of the second leg. In a further exemplary aspect, one of the first leg and the second leg can define a stopper configured to prevent over-bending of the one of the first leg and the second leg with respect to the other of the first leg and the second leg. In a further exemplary aspect, the clip can define a vertical offset between a distal end of the first leg and a distal end of the second leg, the second leg being shorter than the first leg in a direction measured parallel to the centerline axis of the clip. In a further exemplary aspect, a leg thickness of the second leg can be less than a leg thickness of the first leg.

In a further exemplary aspect, an assembly can comprise the suspender; and the clip, the clip being secured to the suspender. In a further exemplary aspect, the assembly can further comprise a cover, the cover comprising a panel and the suspender; the suspender being joined to the panel. In a further exemplary aspect, the assembly can further comprise the base, the base defining a hole, the cover at least partially covering the base and secured to the base with the clip, the clip extending through the hole. In a further exemplary aspect, a width of the hole in a Y-axis direction of the clip proximate to an intermediate portion of the hole can be greater than a width of the hole in the Y-axis direction of the clip distal from the intermediate portion. In a further exemplary aspect, the base can define a sloped wall of the hole. In a further exemplary aspect, the base can comprise an upper body and a lower body assembled to the upper body. In a further exemplary aspect, the base can further comprise a reinforcement ring assembled to a first surface of the base, the base further defining a second surface of the base opposite from the first surface, the clip extending through each of the second surface and the first surface and engaging with the reinforcement ring. In a further exemplary aspect, the base can comprise a panel positioned between the first surface of the base and the reinforcement ring.

In a further exemplary aspect, a method of assembly can comprise inserting the clip into a hole defined in the base, the base defining a first surface and a second surface opposite from the first surface, the hole defined in and extending from each of the first surface and the second surface; and lockably engaging the clip in the hole. In a further exemplary aspect, the method can further comprise engaging a tool with one of the first leg and the second leg of the clip; and inserting the clip into the base with the tool engaged with the one of the first leg and the second leg. In a further exemplary aspect, inserting the clip into the hole defined in the base can comprise rotating the tool with respect to the centerline axis of the clip. In a further exemplary aspect, lockably engaging the clip in the hole can comprise each of the first barb of the first leg and the second barb of the second leg engaging the base proximate to the first surface of the base. In a further exemplary aspect, the method can further comprise pushing a seam of a cover assembly comprising the clip into full engagement with the base from an outer surface of the cover.

In another exemplary aspect, a clip can comprise a chuck; a first leg extending from the chuck; and a second leg extending from the chuck.

One should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily comprise logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Any process descriptions or blocks in flow diagrams should be understood as representing modules, segments, or portions of code which comprise one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described aspect(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A clip for securing a cover to a base, the clip comprising:
    a chuck defining a suspender retention cavity, the suspender retention cavity sized and configured to receive a suspender attached to the cover;
    a first leg extending from the chuck and comprising a first barb, the first barb extending outwardly with respect to a centerline axis of the clip; and
    a second leg extending from the chuck and comprising a second barb, the second barb extending outwardly with respect to the centerline axis of the clip, wherein:
        an angle between a surface of the first barb on a side of the chuck and the first leg is acute,
        an angle between a surface of the second barb on a side of the chuck and the second leg is acute, and
        a shape of the first leg is different from that of the second leg, a functionality of the first leg being different from that of the second leg as a result of the different shape.

2. The clip of claim 1, wherein the clip is symmetric about the centerline axis when viewed along at least one of X-axis, Y-axis, and Z-axis directions.

3. The clip of claim 2, wherein the clip is rotationally symmetric about the centerline axis of the clip.

4. The clip of claim 1, wherein the first barb extends from a distal end of the first leg and the second barb extends from a distal end of the second leg.

5. The clip of claim 1, wherein one of the first leg and the second leg defines a stopper configured to prevent over-bending of the one of the first leg and the second leg with respect to the other of the first leg and the second leg.

6. The clip of claim 1, wherein the clip defines a vertical offset between a distal end of the first leg and a distal end of the second leg, the second leg being shorter than the first leg in a direction measured parallel to the centerline axis of the clip.

7. The clip of claim 1, wherein a leg thickness of the second leg is less than a leg thickness of the first leg.

8. An assembly comprising:
    the suspender; and
    the clip of claim 1, the clip being secured to the suspender.

9. The assembly of claim 8, further comprising a cover, the cover comprising a panel and the suspender; the suspender being joined to the panel.

10. The assembly of claim 9, further comprising the base, the base defining a hole, the cover at least partially covering the base and secured to the base with the clip, the clip extending through the hole.

11. The assembly of claim 10, wherein a width of the hole in a Y-axis direction of the clip proximate to an intermediate portion of the hole is greater than a width of the hole in the Y-axis direction of the clip distal from the intermediate portion.

12. The assembly of claim 10, wherein the base defines a sloped wall of the hole.

13. The assembly of claim 10, wherein the base comprises an upper body and a lower body assembled to the upper body.

14. The assembly of claim 10, wherein the base further comprises a reinforcement ring assembled to a first surface of the base, the base further defining a second surface of the base opposite from the first surface, the clip extending through each of the second surface and the first surface and engaging with the reinforcement ring.

15. The assembly of claim 14, wherein the base comprises a panel positioned between the first surface of the base and the reinforcement ring.

16. A method of assembly comprising:
    inserting the clip of claim 1 into a hole defined in the base, the base defining a first surface and a second surface opposite from the first surface, the hole defined in and extending from each of the first surface and the second surface; and
    lockably engaging the clip in the hole.

17. The method of claim 16, further comprising:
    engaging a tool with one of the first leg and the second leg of the clip; and
    inserting the clip into the base with the tool engaged with the one of the first leg and the second leg.

18. The method of claim 17, wherein inserting the clip into the hole defined in the base comprises rotating the tool with respect to the centerline axis of the clip.

19. The method of claim 16, wherein lockably engaging the clip in the hole comprises each of the first barb of the first leg and the second barb of the second leg engaging the base proximate to the first surface of the base.

20. The method of claim 16, further comprising pushing a seam of a cover assembly comprising the clip into full engagement with the base from an outer surface of the cover.

21. A clip comprising:
   a chuck;
   a first leg extending from the chuck and comprising a first barb; and
   a second leg extending from the chuck and comprising a second barb, wherein:
      an angle between a surface of the first barb on a side of the chuck and the first leg is acute,
      an angle between a surface of the second barb on a side of the chuck and the second leg is acute, and
      a shape of the first leg is different from that of the second leg, a functionality of the first leg being different from that of the second leg as a result of the different shape.

* * * * *